(12) United States Patent
Tanaka et al.

(10) Patent No.: US 8,229,804 B2
(45) Date of Patent: Jul. 24, 2012

(54) TERM CATERING SYSTEM AND TERM CATERING METHOD

(75) Inventors: Takashi Tanaka, Osaka (JP); Taishi Kodama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 359 days.

(21) Appl. No.: 12/549,625

(22) Filed: Aug. 28, 2009

(65) Prior Publication Data

US 2010/0057540 A1 Mar. 4, 2010

(30) Foreign Application Priority Data

Aug. 29, 2008 (JP) ................................. 2008-221531

(51) Int. Cl.
- G06Q 10/00 (2012.01)
- G06Q 30/00 (2012.01)
- G06Q 20/00 (2012.01)
- G06G 1/14 (2006.01)
- A01K 5/02 (2006.01)
- G06F 17/50 (2006.01)

(52) U.S. Cl. ............... 705/28; 705/15; 705/22; 705/29

(58) Field of Classification Search .............. 705/15, 705/22, 28, 29

See application file for complete search history.

(56) References Cited

U.S. PATENT DOCUMENTS

| | | | | |
|---|---|---|---|---|
| 5,333,539 A | * | 8/1994 | Hurley et al. | 99/403 |
| 6,549,818 B1 | * | 4/2003 | Ali | 700/90 |
| 6,789,067 B1 | * | 9/2004 | Liebenow | 705/15 |
| 6,933,483 B2 | * | 8/2005 | Chun | 219/720 |
| 6,957,111 B2 | * | 10/2005 | Zhu et al. | 700/90 |
| 6,976,004 B2 | * | 12/2005 | Wittrup | 705/15 |
| 7,092,988 B1 | * | 8/2006 | Bogatin et al. | 709/203 |
| 2002/0077843 A1 | * | 6/2002 | Halverson | 705/1 |
| 2002/0128853 A1 | | 9/2002 | Kikuchi et al. | |
| 2006/0191885 A1 | * | 8/2006 | Near et al. | 219/214 |
| 2007/0168200 A1 | * | 7/2007 | Shimizu | 705/1 |

FOREIGN PATENT DOCUMENTS

| | | |
|---|---|---|
| JP | 11-31175 A | 2/1999 |
| JP | 2000-356351 A | 12/2000 |
| JP | 2002-31455 A | 1/2002 |
| JP | 2002-63254 A | 2/2002 |
| JP | 2002-92134 A | 3/2002 |
| JP | 2002-269474 A | 9/2002 |
| JP | 2002-279255 A | 9/2002 |

(Continued)

OTHER PUBLICATIONS

Karigome et al. "Related recipe search system based on similarity between dishes and combination." Proceedings of the Fourteenth Annual Meeting of the Association for Natural Language Processing, pp. 959-962, Japan, Mar. 17, 2008.

(Continued)

*Primary Examiner* — Ig T An
(74) *Attorney, Agent, or Firm* — Birch, Stewart, Kolasch & Birch, LLP

(57) ABSTRACT

In a term catering system, a management device held by a delivery agent and a manufacturer of cooking appliances outputs reservation sequence information including sequence identification data corresponding to a reserved cooking menu for each customer and obtains feedback information from the customer. The cooking appliance lent to the customer for a certain term controls cooking of a food material delivered by the delivery agent, according to cooking sequence data specified by the output reservation sequence information, among a plurality of cooking sequence data stored beforehand.

10 Claims, 22 Drawing Sheets

FOREIGN PATENT DOCUMENTS

| | | |
|---|---|---|
| JP | 2003-53315 A | 2/2003 |
| JP | 2003-76907 A | 3/2003 |
| JP | 2003-108799 A | 4/2003 |
| JP | 2003-307313 A | 10/2003 |
| JP | 2004-21402 A | 1/2004 |
| JP | 2006-40270 A | 2/2006 |
| JP | 2006-309420 A | 11/2006 |
| JP | 2007-215548 A | 8/2007 |

OTHER PUBLICATIONS

Kazuyuki Ishihara, et al., "An Evaluation on the Recommendation Method for Personal Taste Recipe Based on the FF-IRF", IEICE Technical Report vol. 107 No. 454, Jan. 17, 2008.

Mayumi Ueda, et al., "Recipe Recommendation Method Based on Personal Use History of Foodstuff", DBWeb 2007 IPSJ Symposium Series, vol. 2007 No. 3, Nov. 27, 2007.

* cited by examiner

FIG.4
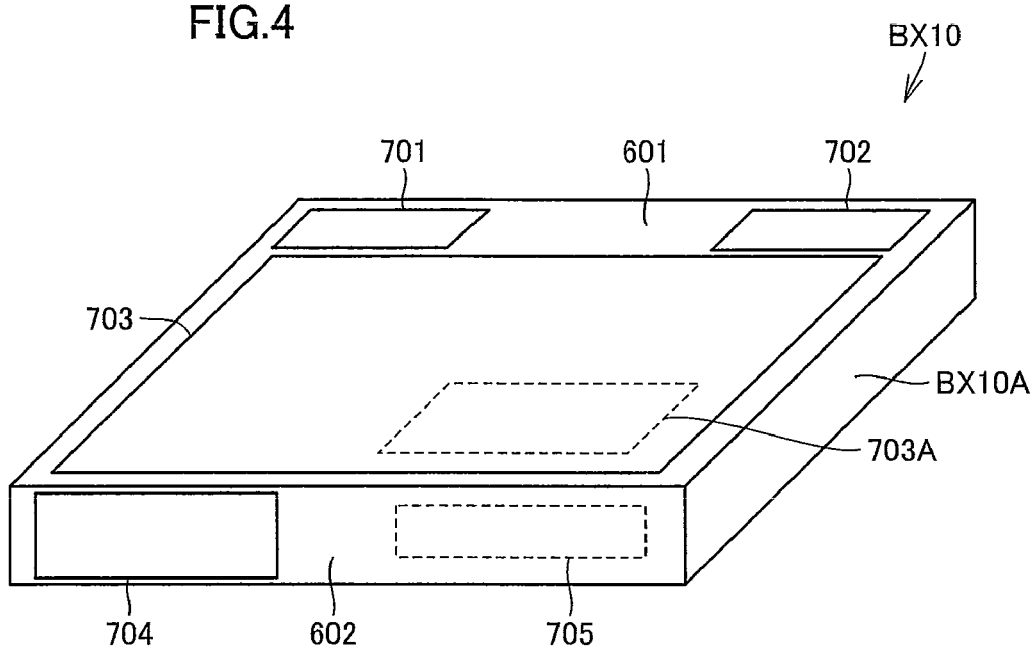
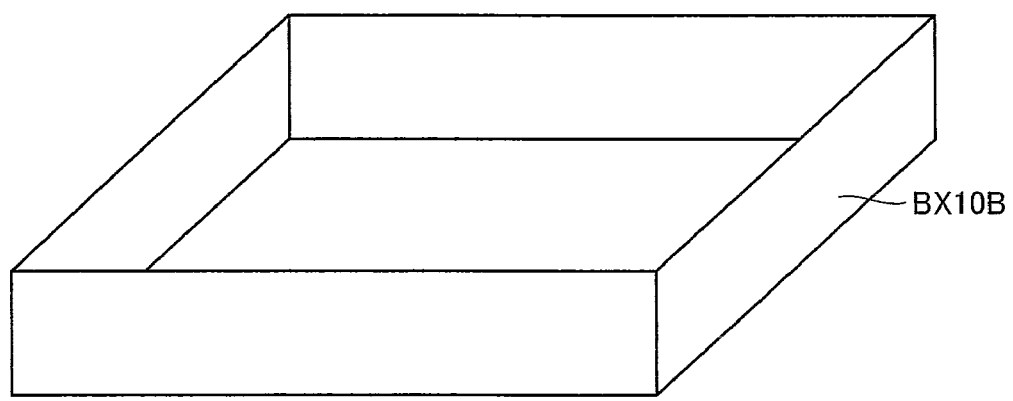

| CN. 4 | LEFT GROUP | | | RIGHT GROUP | | |
|---|---|---|---|---|---|---|
| | CHECK | DELIVERED | RETURNED | CHECK | DELIVERED | RETURNED |
| 1 | AH1002 | | | AH1063 | | |
| 2 | AH1003 | | | AH1065 | | |
| 3 | AH1006 | | | AH1066 | | |
| 4 | AH1022 | | | AH1069 | | |
| 5 | AH1041 | | | AH1074 | | |
| 6 | AH1042 | | | AH1082 | | |
| 7 | AH1046 | | | AH1085 | | |
| 8 | AH1051 | | | AH1090 | | |
| 9 | AH1052 | | | AH1091 | | |
| 10 | AH1060 | | | AH1095 | | |

| DISH No. (=MENU NUMBER) 2000 | MENU NAME 2001 | FOOD MATERIAL 2002 | QUANTITY FOR EACH MATERIAL 2003 | CALORIC RESTRICTION LEVEL (0~5) 2004 | COOKING SEQUENCE No. 2005 | SEASONING 1 | SEASONING 2 | SEASONING 3 | EGG |
|---|---|---|---|---|---|---|---|---|---|
| LC2580 | SUMMER VEGETABLE BITTER MELON FRIED RICE | RICE, BITTER MELON, EGG,... | 150 g RICE, 1/2 BITTER MELON, 1 EGG,... | 0 | LC25800 | SWEETENER 2g | LOW-CALORIE BUTTER 6g | SUGAR-FREE MIRIN 4g | CHOLESTEROL-FREE EGG |
| LC2580 | SUMMER VEGETABLE BITTER MELON FRIED RICE | RICE, BITTER MELON, EGG,... | 150 g RICE, 1/2 BITTER MELON, 1 EGG,... | 1 | LC25801 | SWEETENER 5g | LOW-CALORIE BUTTER 8g | SUGAR-FREE MIRIN 6g | IODINE-ENRICHED EGG |
| LC2580 | SUMMER VEGETABLE BITTER MELON FRIED RICE | RICE, BITTER MELON, EGG,... | 150 g RICE, 1/2 BITTER MELON, 1 EGG,... | 2 | LC25802 | SUGAR 10g | BUTTER 6g | MIRIN 6g | ORDINARY EGG |
| ... | | | | | | | | | |

| COOKING SEQUENCE No. | PREHEATING TIME | PREHEATING TEMPERATURE | HEATING TIME | HEATING TEMPERATURE | |
|---|---|---|---|---|---|
| LC25800 | 10 MINUTES | 150°C | 20 MINUTES | 180°C | |
| LC25801 | 9 MINUTES | 150°C | 18 MINUTES | 180°C | |
| LC25802 | 8 MINUTES | 150°C | 16 MINUTES | 180°C | |
| ... | | | | | |

| | 2020 | 2021 | 2022 | 2023 | 2030 | 2024 | 2025 | | 2026 | 154,254 |
|---|---|---|---|---|---|---|---|---|---|---|
| | CUSTOMER NUMBER | ADDRESS | NAME | EMAIL ADDRESS | CONTRACT STATUS | CALORIC RESTRICTION LEVEL(0~5) | SEASONING LEVEL (1~15) | ELIMINATED MATERIAL 1 (ALLERGY) | ELIMINATED MATERIAL 2 (PREFERENCE) | ELIMINATED MATERIAL 3 (RELIGIOUS AVOIDANCE ETC) |
| | AH 1001 | 1, *** TOWN, *** CITY | userA | abc@cde.jp | START OF CONTRACT 2008/07, TWO-YEAR CONTRACT | 0 | 3 | 1 (BUCKWHEAT) 2 (EGG) | 1 (LEEK) | 1(PORK, LARD), 2(SQUID, OCTOPUS, ETC), 3(CRAB, SHRIMP, ETC), 4(BEEF, BEEF TALLOW) |
| | AH 1002 | 2, *** TOWN, *** CITY | userB | aby@cde.jp | START OF CONTRACT 2007/10, ONE-YEAR CONTRACT | 4 | 12 | NONE | 1(MUSTARD) | NONE |
| | ... | | | | | | | | | |

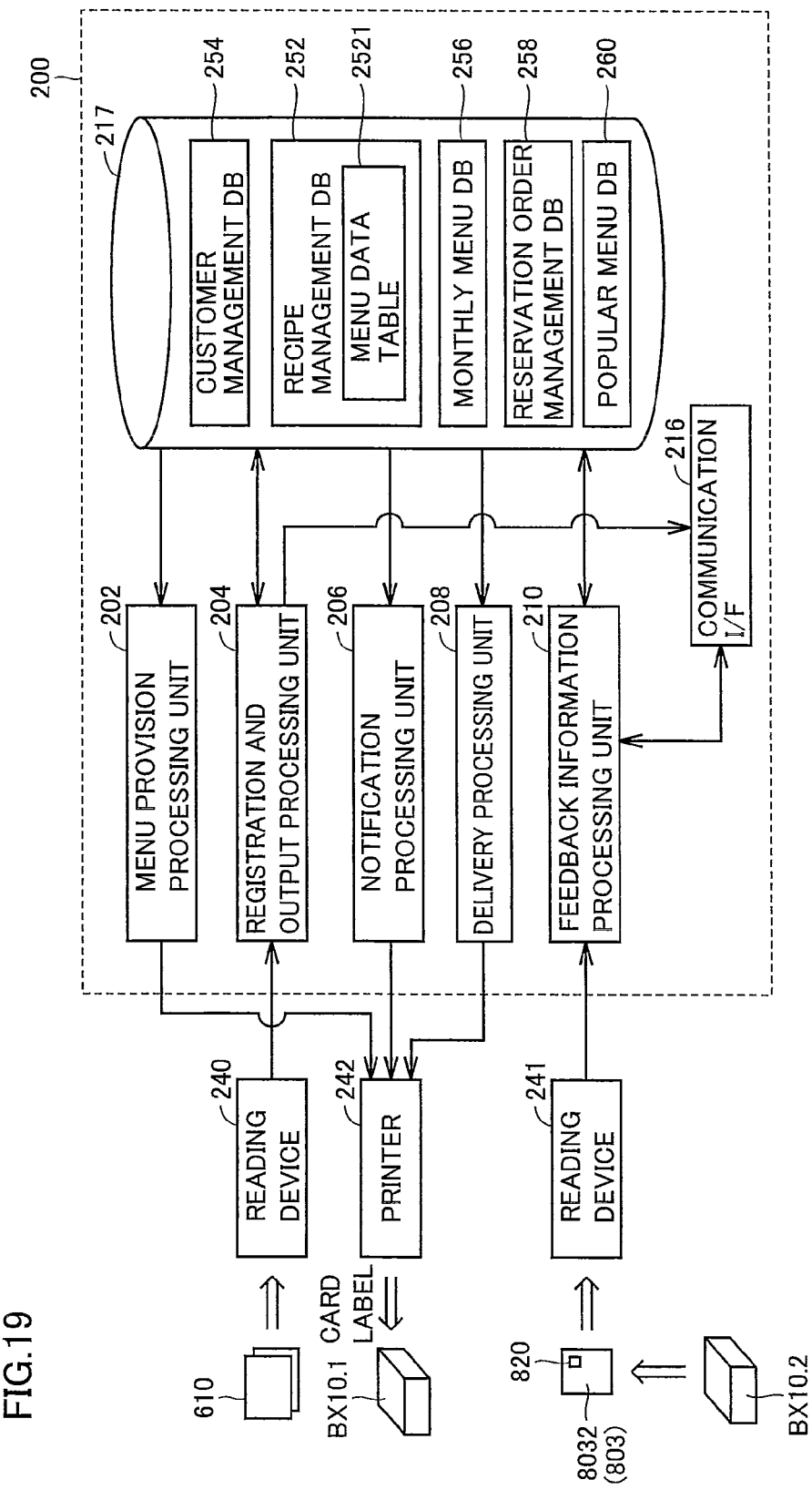

FIG.20

| CUSTOMER NUMBER | ... | 7/1 | 7/2 | 7/3 | ... | 7/31 |
|---|---|---|---|---|---|---|
| 0001 | ... | LC2580 | LC2581 | LC2582 | ... | — |
| 0002 | ... | LC2550 | — | LC2552 | ... | LC2591 |
| ... | ... | | | | | |
| | | | | | | |
| | | | | | | |

| CUSTOMER NUMBER | CUSTOMER NAME |
|---|---|
| AH1002 | userA |

| DATE | MENU NUMBER | MENU NAME | COOKING SEQUENCE No. |
|---|---|---|---|
| 7/1 | LC2580 | SUMMER VEGETABLE BITTER MELON FRIED RICE | LC25800 |
| 7/2 | LC2581 | ABC | LC25810 |
| 7/3 | LC2582 | EFG | LC25820 |
| ... | | | |
| | | | |
| | | | |

| MENU NUMBER (2080) | CALORIC RESTRICTION LEVEL (1~5) (2081) | SATISFACTION LEVEL (2082) | | | | | TOTAL (2083) |
|---|---|---|---|---|---|---|---|
| | | 2 | 1 | 0 | −1 | −2 | |
| LC2580 | 1 | 40 | 30 | 10 | 5 | 0 | 85 |
| | 2 | 10 | 30 | 20 | 10 | 1 | 71 |
| | ... | | | | | | |
| LC2581 | 1 | 0 | 20 | 20 | 20 | 10 | 70 |
| | 2 | 30 | 25 | 20 | 2 | 0 | 77 |
| | ... | | | | | | |
| ... | | | | | | | |

| CALORIC RESTRICTION LEVEL (1~5) (2090) | 2091 | | |
|---|---|---|---|
| | ... | POPULAR MENU NUMBER (JULY) | ... |
| 1 | ... | LC2580 | ... |
| | ... | LC3333 | ... |
| | | ... | |
| 2 | ... | LC2550 | ... |
| | ... | LC2580 | ... |
| | | ... | |
| ... | | | |

| ELAPSED MONTHS | CUMULATIVE LEASE PAYMENTS | LEASE BALANCE | EARLY TERMINATION CHARGE |
|---|---|---|---|
| 1 | 9,300 | 102,300 | 141,600 |
| 2 | 18,600 | 93,000 | 132,300 |
| 3 | 27,900 | 83,700 | 123,000 |
| 4 | 37,200 | 74,400 | 113,700 |
| 5 | 46,500 | 65,100 | 104,400 |
| 6 | 55,800 | 55,800 | 95,100 |
| 7 | 65,100 | 46,500 | 85,800 |
| 8 | 74,400 | 37,200 | 76,500 |
| 9 | 83,700 | 27,900 | 67,200 |
| 10 | 93,000 | 18,600 | 57,900 |
| 11 | 102,300 | 9,300 | 48,600 |
| 12 | 111,600 | 0 | 39,300 |

# TERM CATERING SYSTEM AND TERM CATERING METHOD

This nonprovisional application is based on Japanese Patent Application No. 2008-221531 filed on Aug. 29, 2008 with the Japan Patent Office, the entire contents of which are hereby incorporated by reference.

BACKGROUND OF THE INVENTION

1. Field of the Invention

The present invention relates to a catering system and a term catering method, and more particularly to a term catering system and a term catering method for a delivery agent to deliver food materials to a plurality of customers for a certain term.

2. Description of the Background Art

Conventionally, a variety of proposals have been offered in a system in which a delivery agent delivers food materials to customers.

For example, Japanese Patent Laying-Open No. 11-031175 proposes a system in which menus are searched based on search condition information such as calories or prices desired by consumers and the found menu is presented to the consumers. Japanese Patent Laying-Open No. 2002-279255 proposes that ingredients and recipes of the menus selected by consumers, among menus presented to the consumers, are changed according to the preference of the consumers.

SUMMARY OF THE INVENTION

Basic techniques such as "grill or roast," "boil," "fry," and "steam" are known as traditional heating and cooking methods. Cooking means for such traditional heating and cooking methods are in widespread use. Thus, users learn cooking procedures and heating times as sensory matters and may check a finished state such as a change in appearance of food and a change in hardness of a food material to make a correction to cooking to some extent, thereby avoiding cooking failures.

High-frequency cooking using microwave ovens appeared as a heating and cooking method different from the above-noted traditional heating and cooking methods. When using high-frequency cooking, users were not able to make use of sensory matters that would be obtained with the traditional heating and cooking methods and found it difficult, in particular, to check a finished state. It was therefore difficult to avoid cooking failures. Accordingly, it was necessary to popularize new sensory matters by educational campaigns such as giving microwave cooking classes or issuing cook books for microwave ovens.

In some cooking apparatuses, microprocessors have been used to store heating and cooking procedures (cooking sequences) suitable for a variety of cooking recipes. With such a cooking apparatus, a user can heat and cook according to a heating sequence suitable for the desired cooking recipe, although being ready-made, by selecting a cooking menu suitable for that cooking recipe.

In addition, a method of controlling a heating and cooking time according to a food weight and a method of sensing and controlling a finished state by using a sensor to sense water vapor or smell components emitted from food during cooking have been employed to enable automatic cooking with particular foods and cooking recipes.

In this manner, because of popularization of the sensory matters by educational campaigns over 40 years or longer and the advancement of tools by innovations made by tool manufacturers, high-frequency cookers have achieved recognition of general consumers as well-known cooking apparatuses comparable to the traditional cooking and heating methods, although it is still difficult to check the finished states.

Here, superheated steam ovens have newly emerged. A superheated steam oven "grills or roasts" a food by spraying superheated steam over 100° C. like a shower to the food placed in a sealed heating chamber. Dew drops of condensed steam on the food help remove excessive grease and salt in the food, while the superheated steam drives atmospheric oxygen away to make oxygen-free cooking. Regarding superheated steam ovens, these three virtues of degreasing, desalinating, and deoxidizing came to public appreciation lately.

The heating method by superheated steam ovens has in common with the "steam" cooking in that water vapor is utilized, but greatly differs from it in that superheated steam ovens "grill or roast" food by increasing the food temperature over 100° C., while the "steam" cooking basically gives moistures to food with steam at 100° C. at highest during heating of food.

In a superheated steam oven, it is difficult to check a finished state during cooking. In addition, finishing control using a sensor is also difficult in terms of operating principles.

Therefore, at this moment, superheated steam ovens remain to be cooking apparatuses that provide insufficient sensory matters.

Moreover, applications away from ready-made menus are difficult. Therefore, partly because of expensiveness as compared with microwave ovens having the similar heating function, superheated steam ovens seem to be such cooking apparatuses that consumers "hesitate to use."

On the other hand, superheated steam ovens have a feature that traditional cooking apparatuses including high-frequency ovens do not have. As disclosed, for example, in Japanese Patent Laying-Open No. 2007-215548, a superheated steam oven has a function of condensing steam on the surface of food and removing salt contents and fat contents floated from the inside of the food and taken into the condensed water in a process of cooking. Therefore, salt contents and fat contents are reduced as compared with the traditionally-cooked food, so that the dieting effect and the effect of suppressing lifestyle-related diseases are expected.

As described above, conceivably, educational campaigns equivalent to those required to popularize microwave ovens may be necessary to popularize superheated steam ovens that have newly emerged as home-use cooking apparatuses. However, in order to quickly increase general acceptance and customer satisfaction of superheated steam ovens, the emergence of such a business system is expected that introduces superheated steam ovens to general consumers by highly utilizing the latest information systems, thereby propagating the features of superheated steam ovens swiftly and without any failure experience at a beginner level.

The recipes in Japanese Patent Laying-Open No. 2002-279255 represent the ingredients (kinds and quantities) of foods. Therefore, in a case where cooking of a food material per se is executed by a consumer, the consumer is not always successful in cooking the delivered food material even when the ingredient is changed according to the consumer's preference, as conventionally done.

The present invention is made in order to solve the aforementioned problems. An object of the present invention is to provide a term catering system and a term catering method that allow delivered food materials to be cooked without failure even when cooking of the food materials per se is performed by consumers (customers).

In accordance with an aspect of the present invention, a catering system for a delivery agent to deliver a food material to a plurality of customers for a certain term includes a plurality of cooking appliances to be lent to each of the customers for a certain term and a management device to be held by the delivery agent and a manufacturer of the cooking appliances. The management device includes a first customer management database for managing information concerning the customers and a first recipe management database for storing first recipe information concerning a plurality of cooking menus. The first recipe information has food material data and sequence identification data for identifying cooking sequence data for the cooking appliances, corresponding to each cooking menu. The management device further includes an output processing unit for outputting reservation sequence information including the sequence identification data corresponding to a reserved cooking menu, for each customer. Each cooking appliance includes a first storage unit for storing a plurality of cooking sequence data, in advance, and a cooking control unit for controlling cooking of a food material delivered by the delivery agent, according to cooking sequence data specified by the reservation sequence information output by the management device, among the plurality of cooking sequence data. The management device further includes a second storage unit for storing feedback information concerning a cooking result of the delivered food material from the customer.

Preferably, the management device includes a first terminal to be held by the delivery agent and a server to be connected to the first terminal via the Internet and held by the manufacturer. The first terminal has the above-noted first customer management database, the above-noted first recipe management database, the above-noted output processing unit, and the above-noted first information processing unit, and further has a first information processing unit for performing a process for obtaining the feedback information from the customer and transmitting the obtained feedback information to the server. The server has the second storage unit.

Preferably, the first customer management database stores one of a plurality of caloric restriction levels, for each customer. The first recipe information has a plurality of sequence identification data respectively corresponding to the caloric restriction levels, for each cooking menu. The output processing unit selects the sequence identification data according to the corresponding caloric restriction level, for each customer, and generates the reservation sequence information including the selected sequence identification data.

Preferably, the server further includes a second customer management database for managing information concerning the customer as transmitted in advance by the first terminal and a second recipe management database for managing second recipe information concerning the plurality of cooking menus. The second recipe information has the food material data and the cooking sequence data that are associated with a combination of each cooking menu and each caloric restriction level.

Preferably, the server further includes a second information processing unit for generating ranking information of popular menus based on the feedback information, for each caloric restriction level, and transmitting the generated ranking information to the first terminal. The first terminal further includes a menu provision unit for providing information concerning the cooking menus that reflect the ranking information transmitted from the server.

Preferably, the menu provision unit provides the information concerning the cooking menus that are sorted in an ranking order based on the ranking information.

Preferably, the first customer management database further stores a seasoning level for each customer. The first information processing unit additionally adjusts the seasoning level based on the feedback information.

Preferably, the term catering system further includes a second terminal connected with the first terminal via the Internet and held by each customer. The output processing unit transmits the reservation sequence information to the second terminal. Preferably, the second terminal includes a transfer processing unit for performing a process for transferring to the cooking appliance the reservation sequence information transmitted from the first terminal. The first storage unit further stores the reservation sequence information transferred from the second terminal.

Preferably, the first customer management database further stores contract status data including a lease starting date and a contract term of the cooking appliance, for each customer. The first terminal further includes a notification processing unit for performing a process for calculating cancellation charges based on the contract status data at prescribed intervals and notifying the customer of the calculated cancellation charges.

Preferably, the notification processing unit further notifies the customer of a reduction rate of each calculated cancellation charge together with the calculated cancellation charges.

Preferably, the first terminal further includes a delivery processing unit for generating authentication information based on customer identification information for identifying the customer who receives a delivered food material and menu identification information for identifying the cooking menu corresponding to the food material, and then adding the authentication information to document data to be attached to a special container for use in delivery of the food material.

Preferably, the authentication information is a numerical value calculated by applying a prescribed algorithm to the customer identification information and the menu identification information.

In accordance with another aspect of the present invention, a term catering method for a delivery agent to deliver food materials to a plurality of customers for a certain term is executed by a plurality of cooking appliances lent to each customer for a certain term and by a management device held by the delivery agent and a manufacturer of the cooking appliances. The management device includes a customer management database for managing information concerning the customers and a recipe management database for storing recipe information concerning a plurality of cooking menus. The recipe information has food material data and sequence identification data for identifying cooking sequence data for the cooking appliances, corresponding to each cooking menu. The term catering method includes the steps of: the management device outputting reservation sequence information including the sequence identification data corresponding to a reserved cooking menu for each customer; the cooking appliance specifying one of a plurality of cooking sequence data stored beforehand, based on the reservation sequence information output by the management device; the cooking appliance controlling cooking of a food material delivered by the delivery agent, according to the specified cooking sequence data; and the management device storing feedback information concerning a cooking result of the delivered food material from the customer.

In accordance with the present invention, cooking of food materials is controlled in a cooking appliance in accordance with cooking sequence data corresponding to a reserved cooking menu, so that a failure in cooking food materials is avoided.

In addition, a manufacturer of the cooking appliances can easily obtain feedback information from the customers.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows an exemplary external view of a special container in the embodiment of the present invention.

FIG. 16 shows an exemplary data structure in a menu data table in a recipe management DB.

FIG. 17 shows an exemplary data structure in a sequence data table in the recipe management DB.

FIG. 18 shows an exemplary data structure of a customer management DB.

FIG. 19 is a functional block diagram showing a functional configuration of the delivery agent terminal in the embodiment of the present invention.

FIG. 20 shows an exemplary data structure of a reservation order management DB.

FIG. 29 shows an exemplary data structure of an evaluation management table stored in a popular menu management DB.

FIG. 30 shows an exemplary data structure of a popular menu ranking table stored in the popular menu management DB.

DESCRIPTION OF THE PREFERRED EMBODIMENTS

Figure 1:
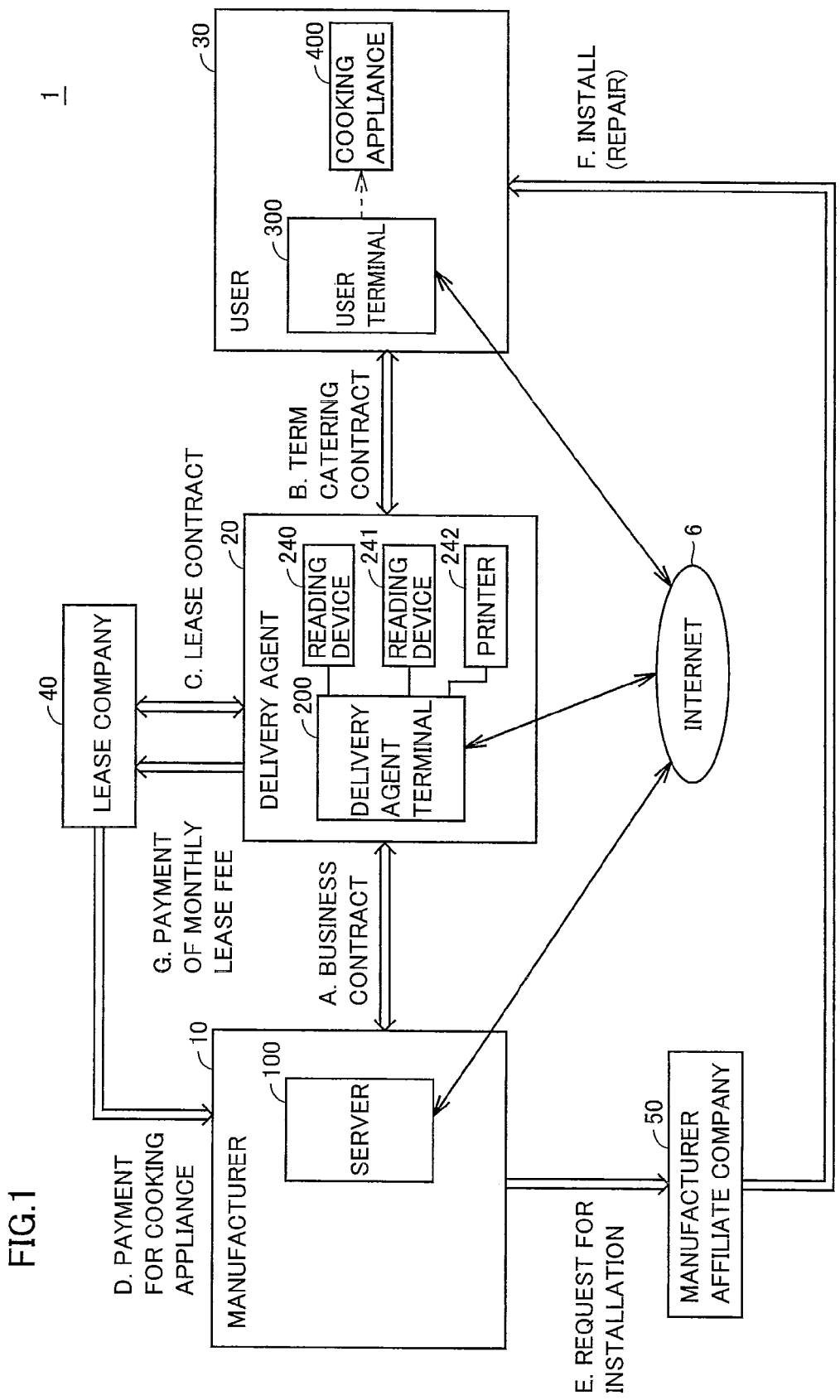
FIG. 1 is a block diagram showing an overall configuration of a term catering system in an embodiment of the present invention.

An embodiment of the present invention will be described in detail with reference to the figures. It is noted that the same or corresponding parts in the figures will be denoted with the same reference characters and a description thereof will not be repeated.

In a term catering system in accordance with the present invention, particular cooking appliances are lent (for example, leased) to customers (members) of a delivery agent delivering food materials, and a manufacturer of the cooking appliances provides the customers with cooking sequences most suitable for the food materials. In the following, an embodiment of the term catering system in accordance with the present invention will be described.

<System Overview>

First of all, an overview of the term catering system in the present embodiment will be described.

Currently, many people are seeking for gourmet foods. When general consumers want to eat any particular dish, they first think about going to restaurants that offer the particular dish on the menu. In this case, food materials obtained by professionals are prepared by professionals using professional cooking tools. The finished quality of the provided food is thus guaranteed.

Now, when consumers want to prepare and eat any particular dish at home, or when they purchase cooking appliances of a new type, it is not easy to taste delicious dishes with certainty without failures that beginners would make.

Catering service has conventionally been available. This is a service provided on the occasion of parties etc. Specifically, caterers bring in food materials, cooking tools, and table wares to venues, and professionals cook to serve meals to the guests.

The generally-known catering provides the above-noted full set of services. This is called "full catering" here.

A part of such a full catering service may be done by consumers. More specifically, while caterers bring in food materials, cooking tools, and table wares to venues, consumers are in charge of cooking. This is called "half catering" here.

However, only with food materials and cooking tools and without detailed recipes, the cooking may end in failure. Therefore, provision of recipes is essential in half catering.

In any case, the generally-known catering service is only for occasional use and is not the one that is accepted on a steady basis, in terms of costs and the volume of dishes.

By contrast, the term catering system in accordance with the embodiment of the present invention makes catering service continuously available for a certain term, with the framework of half catering being modified for household use in terms of volume. In this sense, this catering service is a term and stationary catering service.

As described above, it is the key point of the present system to guarantee tastes of food materials with recipes for a limited lending term of cooking appliances and also to ensure collection of term use fees.

(Overall Configuration)

FIG. 1 is a block diagram showing an overall configuration of a term catering system 1 in the embodiment of the present invention.

Referring to FIG. 1, term catering system 1 is a system for a delivery agent 20 to deliver (cater) food materials to a user (customer) 30 for a certain term and is mainly operated by a manufacturer 10 selling a cooking appliance 400, delivery agent 20 delivering food materials, user 30 as a customer, a lease company 40 leasing cooking appliance 400, and a company affiliated with the manufacturer (manufacturer affiliate company) 50 performing maintenance etc. of cooking appliance 400. Lease company 40 may or may not be a lease company affiliated with manufacturer 10. Although FIG. 1 only shows one user 30, there are actually a plurality of users.

Manufacturer 10 owns a server 100. Delivery agent 20 owns a delivery agent terminal 200. User 30 may own a user terminal 300. Server 100, delivery agent terminal 200, and user terminal 300 are connected via the Internet 6.

Manufacturer 10 and delivery agent 20 hold a business contract (agreement) for the present system 1 with each other. Delivery agent 20 and user 30 hold a term catering contract (agreement) with each other to allow the present system 1 to function. Upon conclusion of the term catering contract, a lease contract between lease company 40 leasing cooking appliance 400 and delivery agent 20 are effected.

In the present embodiment, the term catering contract is made annually within the limit of a prescribed period (for example, three years). In a case where a contract over three years is desired, a new contract is made with cooking appliance 400 replaced with a new one.

Upon conclusion of the lease contract, lease company 40 pays for cooking appliance 400 to manufacturer 10. Manufacturer 10 requests manufacturer affiliate company 50 to install cooking appliance 400 at the home of user 30. At the request to install, manufacturer affiliate company 50 installs cooking appliance 400 at the home of user 30. Once the term catering service is started, delivery agent 20 pays monthly lease fees to lease company 40 during the contract term.

In this manner, in accordance with the present embodiment, user 30 holds a term catering contract with delivery agent 20 to obtain a right of term use of cooking appliance 400. Since delivery agent 20 holds a lease contract with lease company 40 on behalf of user 30, user 30 does not have to do complicated procedures for borrowing cooking appliance 400. The present invention, however, is not limited to such a manner. Delivery agent 20 may hold a lease contract with user 30, and delivery agent 20 may only pay lease fees on behalf of the user.

Once the term catering system is started in the foregoing manner, the function of term catering system 1 is realized by server 100, delivery agent terminal 200, user terminal 300, and cooking appliance 400 during the contract term. Delivery agent terminal 200 is connected to reading devices 240, 241 and a printer 242, which will be described in detailed later.

In the present embodiment, delivery agent 20 and manufacturer 10 have delivery agent terminal 200 and server 100, respectively, by way of illustration. Delivery agent terminal 200 and server 100, however, which are the devices of the providers of the present service, may be realized by a common device (referred to as a "management device"). In such a case, the hardware configuration of the management device may the same as delivery agent terminal 200.

Here, term catering system 1 is configured with a system unit for food material ordering and supply management and a system unit for individual distribution of food materials. The system unit for food material ordering and supply management is basically a management system similar to a production control system for plants and may be configured by applying well-known techniques. Therefore, in the following, only a feature of the system unit for individual distribution of food materials will be described.

(Overview of Goods and Information Flow)

Figure 2:
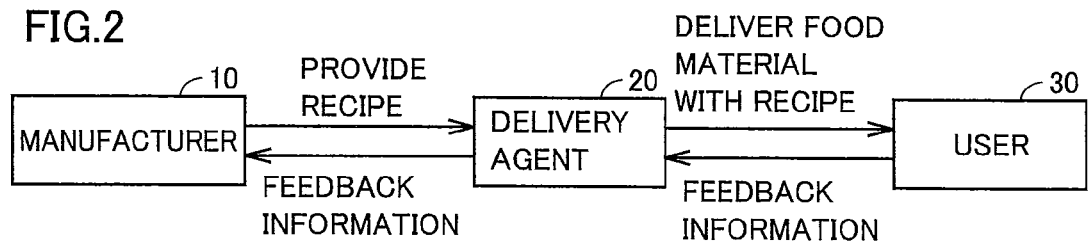
FIG. 2 schematically shows a flow of goods and information in the term catering system in the embodiment of the present invention.

FIG. 2 schematically shows a flow of goods and information in term catering system 1 in the embodiment of the present invention.

Referring to FIG. 2, manufacturer 10 provides delivery agent 20 with a recipe for each cooking menu. Here, "recipe" represents sequence data of cooking appliance 400. Delivery agent 20 delivers food materials with their recipes to user 30. Specifically, user 30 is provided with not only food materials (including blended seasonings) cut appropriately for dishes but also recipe information necessary to cook the food materials with cooking appliance 400, that is, sequence identification data for specifying the sequence data. Food materials and recipe information may not be provided at the same timing.

In the present embodiment, on the premise that cooking appliance 400 is used to cook food materials distributed by delivery agent 20, the use right for a certain term (the contract term by the user) is given to user 30. The recipes for food materials provided to user 30 are specialized for cooking appliance 400 included in the present system 1. Therefore, although the finished quality of food is guaranteed when cooking is done with cooking appliance 400, the finished quality is not guaranteed with any other kind of cooking apparatuses.

User 30 gives feedback information about food materials with recipes to delivery agent terminal 200 of delivery agent 20. Delivery agent terminal 200 transfers the feedback information obtained from user 30 to server 100 of manufacturer 10. Manufacturer 10 obtains the feedback information, for example, to makes use of it in developing new recipes. Server 100 of manufacturer 10 can execute a prescribed process using the feedback information. For example, ranking information of presently existing cooking menus may be created. It is noted that a prescribed process may also be performed in delivery agent terminal 200 based on the feedback information obtained from user 30.

Since delivery agent 20 pays lease fees on behalf of user 30, delivery agent 20 may add any particular amount (for example, 100-300 yen depending on menus) to the price for the distributed food material with recipe, in order to collect the consideration.

Figure 3:
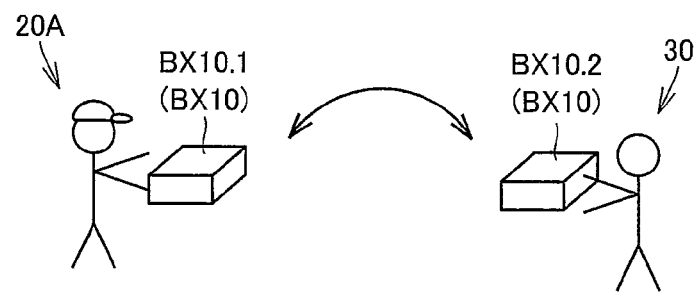
FIG. 3 shows a manner of a food delivery method between a delivery agent and a user.

FIG. 3 shows a manner of a food delivery method between delivery agent 20 and user 30. Referring to FIG. 3, in the present embodiment, two special containers (returnable boxes) BX10 are prepared for each user 30. A deliveryman 20A of delivery agent 20 delivers a special container BX10.1 containing food materials to user 30. The delivered special container BX10.1 is kept by user 30 until the next delivery. When receiving food materials, user 30 returns an empty special container BX10.2 used for the previous delivery to deliveryman 20A.

(Special Container)

FIG. 4 is an exemplary external view of special container BX10 in the embodiment of the present invention.

Referring to FIG. 4, special container BX10 includes a cover portion BX10A and a container portion BX10B. For the purpose of physical distribution and for the purpose of communicating information with user 30, a card and/or a label can be attached to cover portion BX10A. Specifically, cover portion BX10A is provided with three card holders 701, 702, 703 on a top face 601 thereof. Card holder 703 may be provided with a window portion 703A for facilitating input in a questionnaire as described later. On a side face 602 of cover portion BX10A, a card holder 704 and a label-affixed portion 705 are arranged.

Container portion BX10B may be a general box-shaped container having such obvious characteristics as being made of a material suitable for containing food and having a strength to resist the repeated use. Whether the container is provided with heat insulation or with thermal conductivity may be chosen according to the convenience of transportation. More specifically, if the container is stored, for example, in the inside of a refrigerator for delivery, the container is preferably provided with heat conductivity. On the other hand, if the container stored at low temperatures is transported at low temperatures kept by a refrigerant attached inside, the container is preferably provided with heat insulation.

Figure 5:
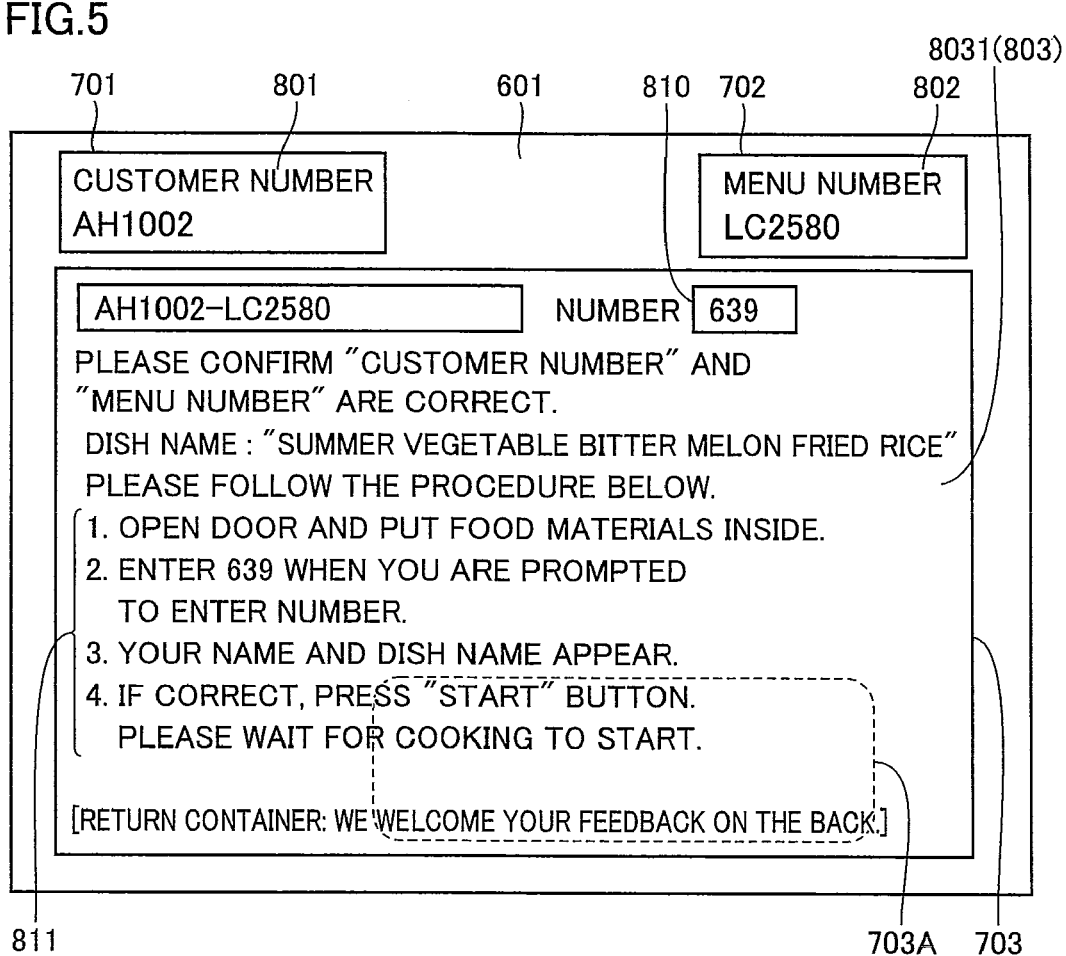
FIG. 5 shows an example of contents of three cards arranged on a top face of a cover portion of the special container including food materials.

FIG. 5 shows an example of contents of three cards arranged on top face 601 of cover portion BX10A of special container BX10.1 containing a food material.

Referring to FIG. 5, three cards 801, 802, and 803 are arranged in respective three card holders 701, 702, and 703. A customer number, more specifically, the customer number of user 30 receiving the delivered food material is provided on card 801. A menu number for specifying a cooking menu corresponding to the food material contained in special container BX10.1 is provided on card 802.

Figure 6:
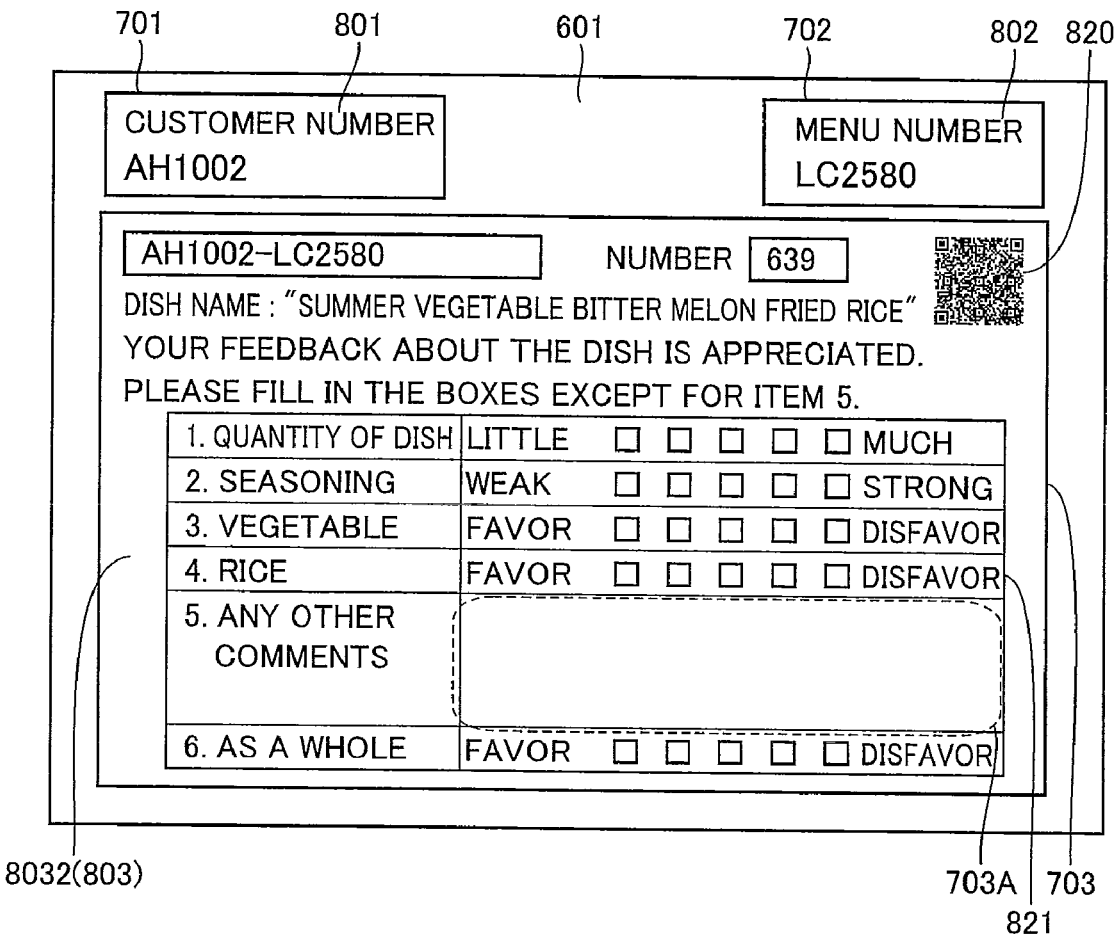
FIG. 6 shows an example of contents of three cards arranged on the top face of the cover portion of the empty special container.

Card 803 has a front face 8031 and a back face 8032 (FIG. 6). When deliveryman 20A attaches card 803 to special container BX10.1 to be delivered to user 30, card 803 is arranged in card holder 703 with front face 8031 facing up. A cooking guide for the food material contained in special container BX 10.1 is provided on front face 8031. Specifically, provided are a three-digit reference number 810 as authentication information unique to user 30 and an operation procedure 811 for cooking the food material with cooking appliance 400.

FIG. 6 shows an example of contents of three cards arranged on top face 601 of cover portion BX10A of the empty special container BX10.2.

Referring to FIG. 6, when returning special container BX10, user 30 flips card 803 over so that back face 8032 faces up. Back face 8032 includes a questionnaire for use as feedback information. The questionnaire includes, for example, a QR code 820 that two-dimensionally represents the customer number and an evaluation section 821 to be filled out with evaluation of food materials.

In this manner, card 803 functions as a cooking guide card at a time of delivery and as a customer wish card at a time of return.

Figure 7:
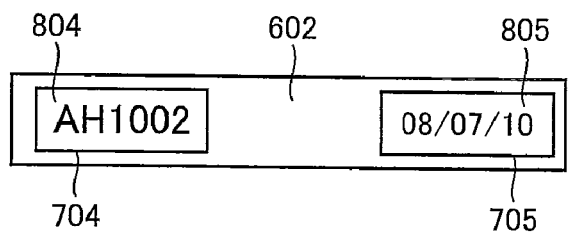
FIG. 7 shows an example of contents of a card and a label arranged on a side face of the cover portion of the special container.

FIG. 7 shows an example of contents of card 804 and label 805 arranged on side face 602 of cover portion BX10A of special container BX10.

Referring to FIG. 7, card 804 is arranged in card holder 704 and is provided with a customer number, similarly to card 801 shown in FIG. 5. Label 805 is affixed to label-affixed portion 705 and is provided with a delivery date.

Such card 804 and label 805 are arranged on side face 602 of cover portion BX10A of special container BX10 to allow deliveryman 20A to deliver special container BX10 smoothly.

Figure 8:
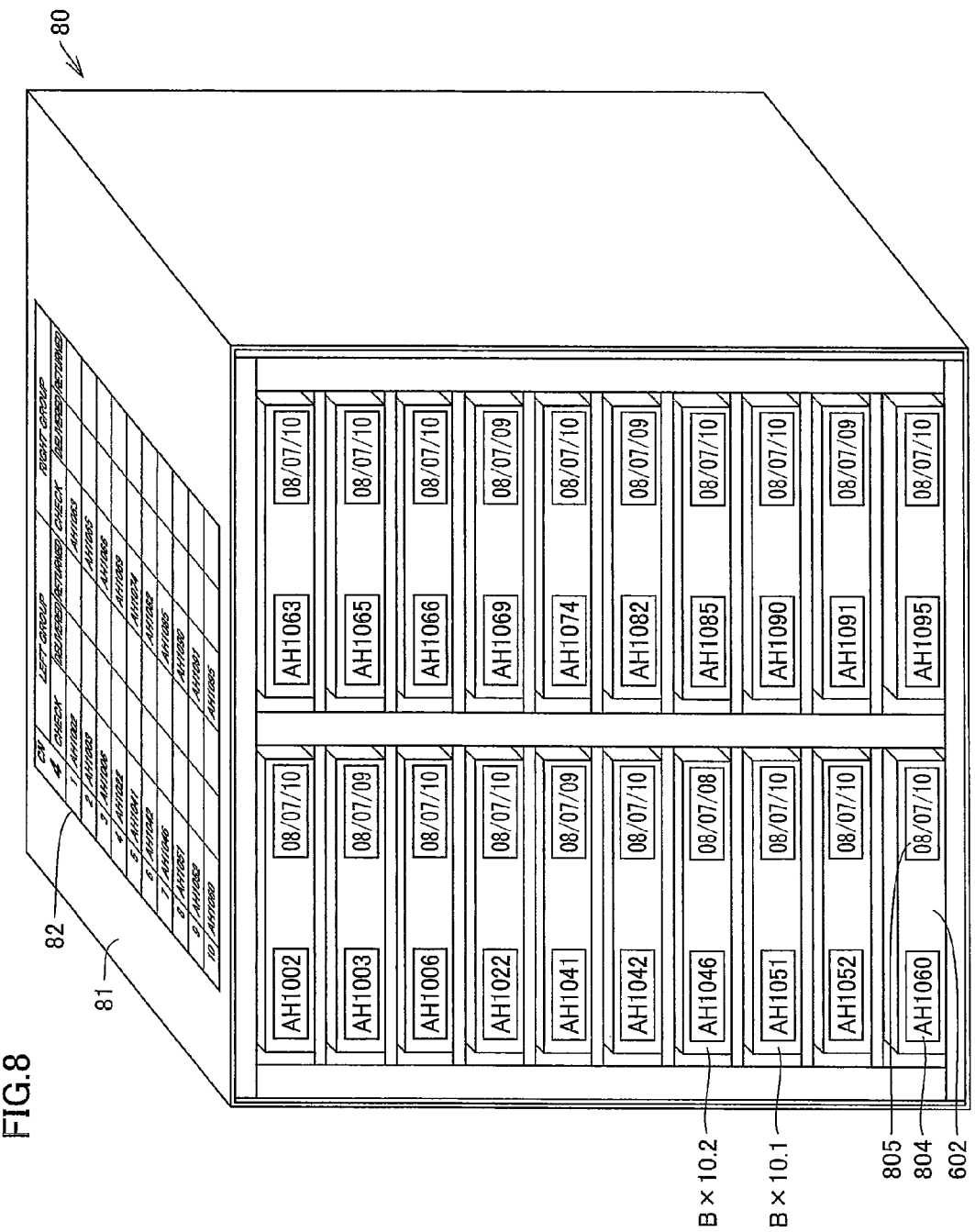
FIG. 8 shows an exemplary configuration of storage shelves of a food delivery vehicle in the embodiment of the present invention.

FIG. 8 shows an exemplary configuration of storage shelves 80 of a food delivery vehicle in the embodiment of the present invention.

Referring to FIG. 8, storage shelves 80 have a plurality of partitions so that special container BX10 can be stored individually in each shelf. Special container BX10 can thus be accessed at random. Therefore, even when special containers BX10.1 including new food materials and recovered special containers BX10.2 are mixed, special container BX10 can be managed without any trouble for each customer number indicated by card 804. In addition, date label 805 allows deliveryman 20A to visually distinguish between new and old ones.

Figures 9, 10:
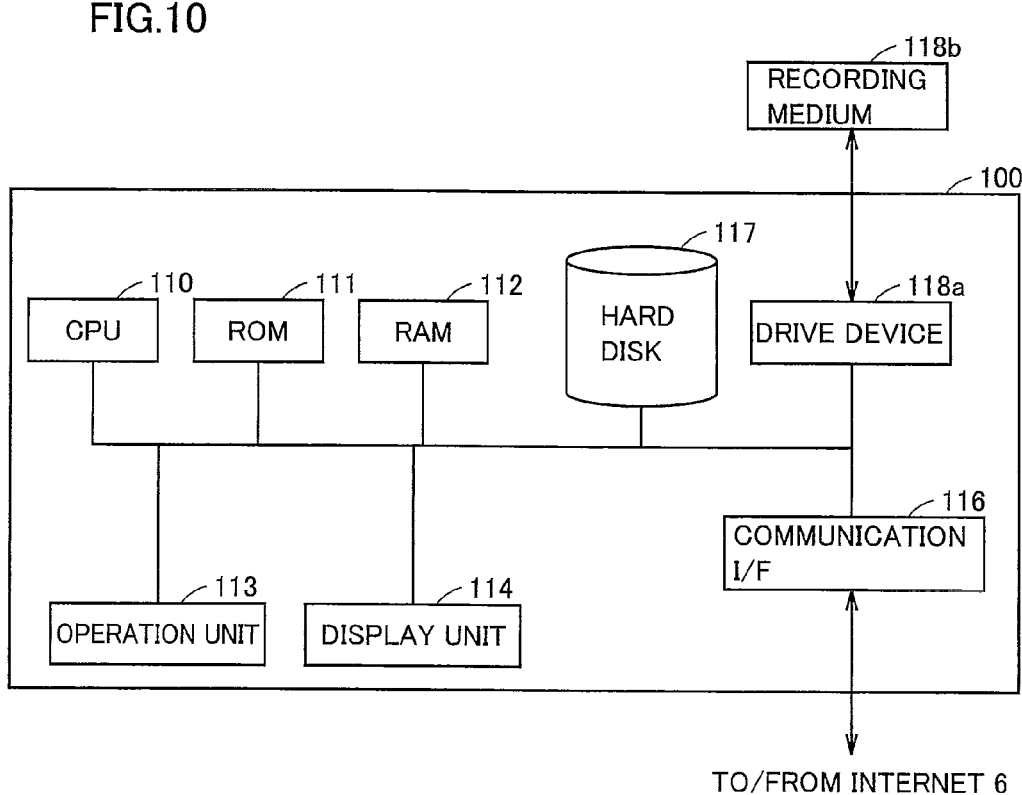
FIG. 9 shows a specific example of a delivery checklist.
FIG. 10 is a block diagram showing a hardware configuration of a server in the embodiment of the present invention.

Deliveryman 20A delivers food materials based on a delivery checklist 82 as shown in FIG. 9. In FIG. 8, delivery checklist 82 is arranged on a top face 81 of storage shelves 80.

FIG. 9 shows a specific example of contents of delivery checklist 82.

Referring to FIG. 9, delivery checklist 82 is configured similarly to the arrangement and configuration of special containers BX10 for the respective customers in storage shelves 80. By doing so, it is easily check whether the containers have been delivered or recovered.

<Hardware Configuration>

Now, an exemplary hardware configuration of each device included in term catering system 1 in the present embodiment will be described.

(Hardware Configuration of Server)

FIG. 10 is a block diagram showing a hardware configuration of server 100 in the embodiment of the present invention.

Referring to FIG. 10, server 100 may have a configuration similar to that of a general personal computer and includes a CPU (Central Processing Unit) 110 for performing a variety of operations, a ROM (Read Only Memory) 111 for storing a variety of data and programs, a RAM (Random Access Memory) 112 for storing work data and the like, an operation unit 113 for accepting an instruction from the operator, a display unit 114 for displaying a variety of information, a communication I/F (interface) 116 for communications via the Internet 6, a hard disk 117, and a drive device 118a capable of reading/writing data and programs from/into a recording medium 118b. Recording medium 118b may be, for example, an optical medium such as a CD-ROM (Compact Disc-ROM) or a memory card.

(Hardware Configuration of Delivery Agent Terminal)

Figure 11:
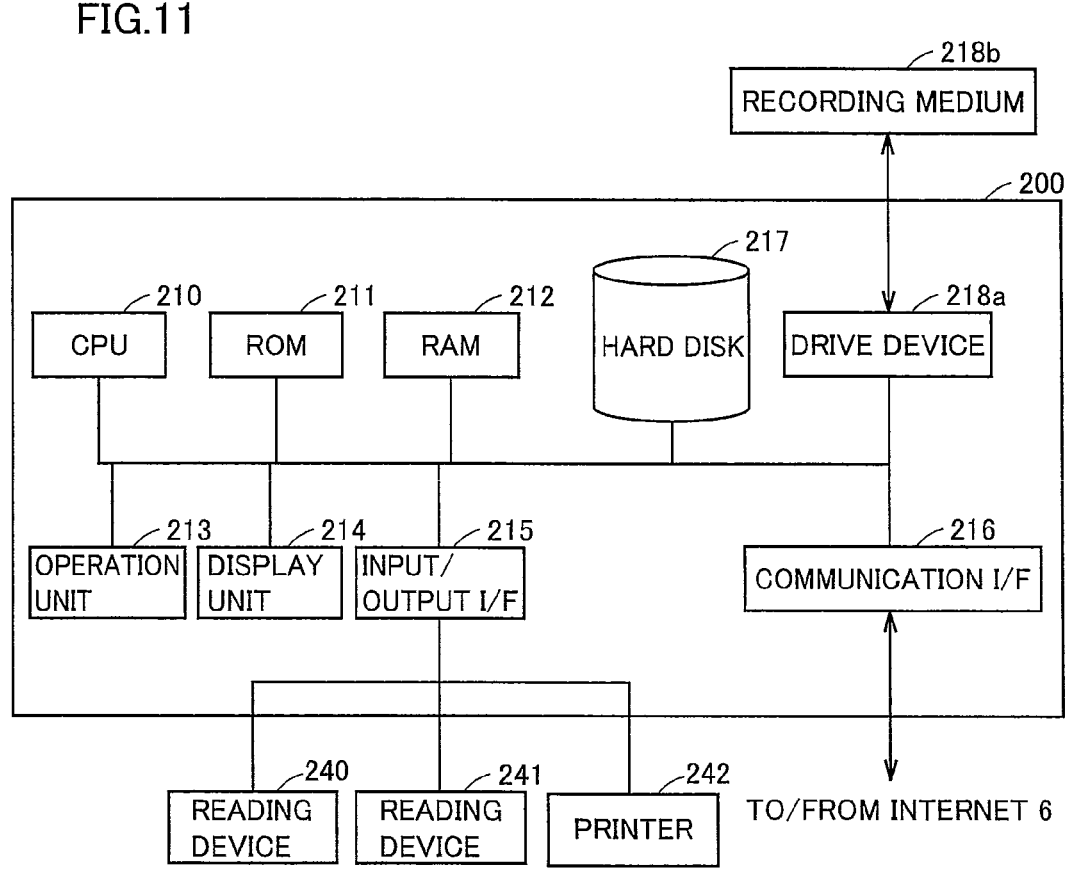
FIG. 11 is a block diagram showing a hardware configuration of a delivery agent terminal in the embodiment of the present invention.

FIG. 11 is a block diagram showing a hardware configuration of delivery agent terminal 200 in the embodiment of the present invention.

Referring to FIG. 11, delivery agent terminal 200 also has a configuration similar to that of server 100 and includes a CPU 210, a ROM 211, a RAM 212, an operation unit 213, a display unit 214, a communication I/F 216, a hard disk 217, and a drive device 218a capable of reading/writing data from/ into a recording medium 218b.

Delivery agent terminal 200 further includes an input/output I/F 215 for inputting/outputting information to/from reading devices 240, 241 and a printer 242. Reading device 240 reads a menu designated by the user from a menu application form and outputs the read menu to CPU 210 through input/output I/F 215. Reading device 241 reads QR code 820 (FIG. 6) provided on card 803 functioning as the above-noted customer wish card and outputs the read QR code to CPU 210 through input/output I/F 215. Printer 242 prints menu lists, cards 801-804, label 805, and the like, in response to a control signal from CPU 210.

(Hardware Configuration of User Terminal)

Figure 12:
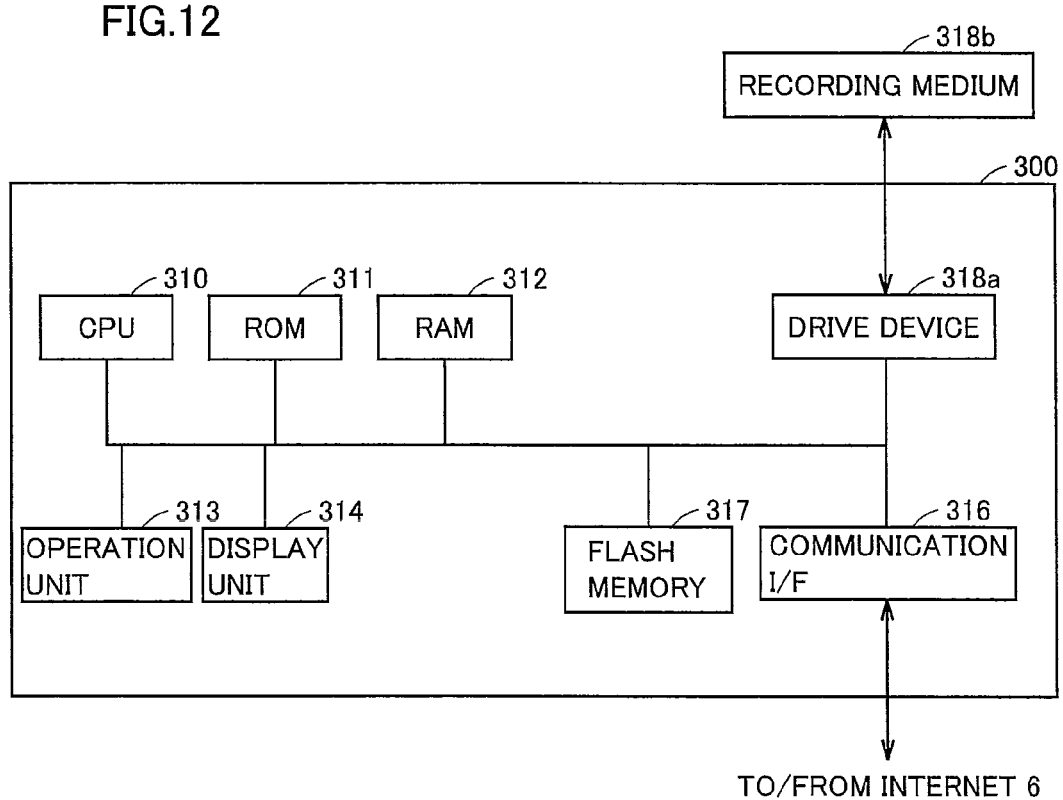
FIG. 12 is a block diagram showing a hardware configuration of a user terminal in the embodiment of the present invention.

FIG. 12 is a block diagram showing a hardware configuration of user terminal 300 in the embodiment of the present invention.

Referring to FIG. 12, user terminal 300 is, for example, a general portable terminal (such as a mobile phone) and includes a CPU 310, a ROM 311, a RAM 312, an operation unit 313, a display unit 314, a communication I/F 316, a flash memory 317, and a drive device 318a capable of reading/writing data and programs from/into a recording medium 318b. Recording medium 318b is, for example, a memory card. It is noted that user terminal 300 may further include a mechanism (not shown) to allow data communications with cooking appliance 400.

(Appearance and Hardware Configuration of Cooking Appliance)

Figure 13:
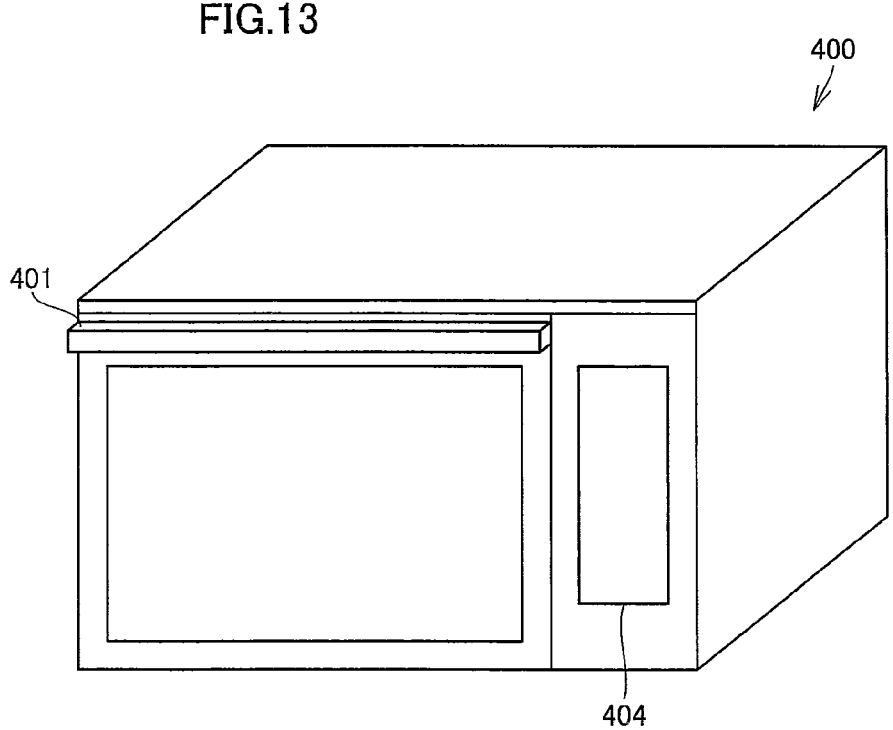
FIG. 13 is an exemplary external view of a cooking appliance in the embodiment of the present invention.

FIG. 13 shows an exemplary external view of cooking appliance 400 in the embodiment of the present invention.

Referring to FIG. 13, cooking appliance 400 is a heating and cooking apparatus (oven) and more particularly a superheated steam oven capable of heating and cooking foods using superheated steam. Although in the present embodiment the cooking appliance 400 is a heating and cooking apparatus, the present invention is not limited thereto as long as it is a home-use cooker capable of cooking food materials. A door 401 and an operation panel 404 are provided on the front face of cooking appliance 400.

Figure 14:
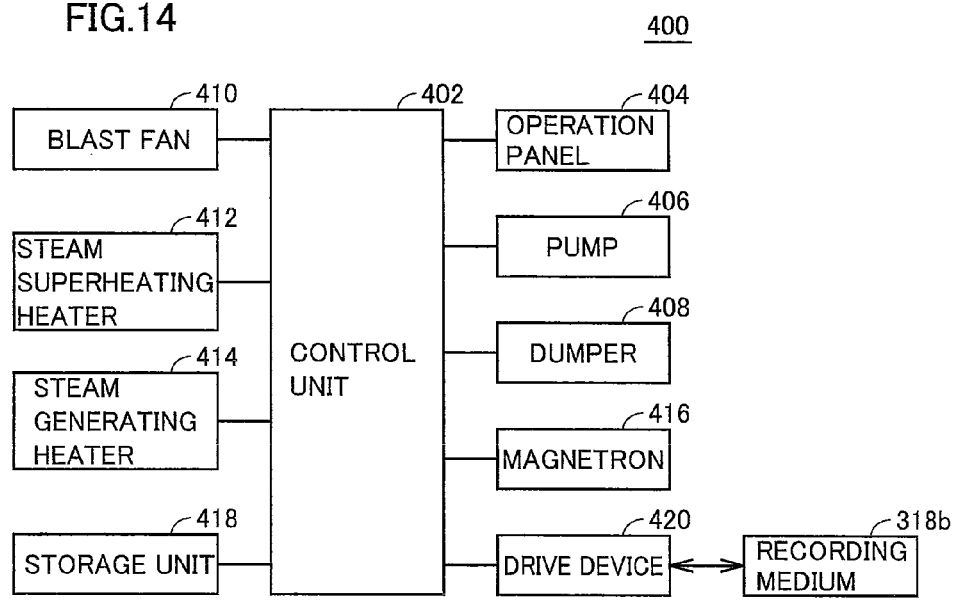
FIG. 14 shows an exemplary hardware configuration of the cooking appliance in the embodiment of the present invention.

FIG. 14 shows an exemplary hardware configuration of cooking appliance 400 in the embodiment of the present invention.

Referring to FIG. 14, cooking appliance 400 includes a control unit 402, an operation panel 404, a pump 406 for feeding a steam generator (not shown) with water in a water tank (not shown), a damper 408 for opening/closing an exhaust path (not shown), a blast fan 410, a steam-superheating heater 412, a steam generating heater 414, a magnetron 416 for generating a microwave for heating a heating target, a storage unit 418, and a drive device 420 for externally inputting/outputting information.

Control unit 402 is comprised, for example, of a microcomputer, an input/output circuit, and the like. Operation panel 404 is comprised, for example, of a liquid crystal panel to accept the operator's instruction and display a variety of information. Storage unit 418 is a non-volatile memory (for example, flash memory). Drive device 420 is capable of, for example, reading data recorded on the aforementioned recording medium 318b.

Cooking appliance 400 may further include a mechanism (not shown) for allowing data communications with user terminal 300. Specifically, for example, a method disclosed in Japanese Patent Laying-Open No. 2000-356351 may be used to communicate data between them through a relay device. In this case, cooking appliance 400 may be equipped with a relay terminal for connecting a UART (Universal Asynchronous Receiver Transmitter) interface of a relay box as a relay device. Alternatively, cooking appliance 400 may be equipped with a USB (Universal Serial Bus) connection terminal as serial data transfer means and a communication procedure for data transfer using the USB connection terminal, so that data can be communicated between user terminal 300 and cooking appliance 400 by connecting the USB terminal of user terminal 300 with the USB terminal of cooking appliance 400.

<Functional Configuration>

Now, an exemplary functional configuration of each device included in term catering system 1 in the present embodiment will be described.

(Functional Configuration of Server)

Figure 15:
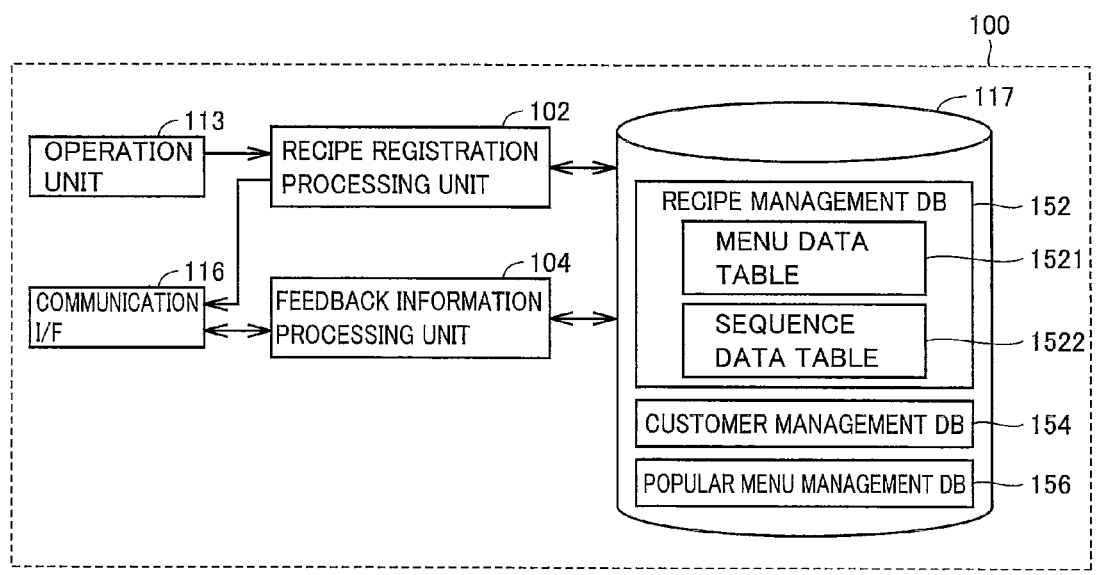
FIG. 15 is a functional block diagram showing a functional configuration of the server in the embodiment of the present invention.

FIG. 15 is a functional block diagram showing a functional configuration of server 100 in the embodiment of the present invention.

Referring to FIG. 15, server 100 includes as its function a recipe registration processing unit 102 and a feedback information processing unit 104. A hard disk 117 of server 100 includes a recipe management DB (database) 152, a customer management DB 154, and a popular menu management DB 156.

First, each DB of server 100 will be described.

Recipe management DB 152 manages recipe information concerning a plurality of cooking menus in cooking appliance 400. Recipe management DB 152 has a menu data table 1521 and a sequence data table 1522. FIG. 16 and FIG. 17 show the respective data structures by way of example.

FIG. 16 shows an exemplary data structure of menu data table 1521 in recipe management DB 152.

Referring to FIG. 16, menu data table 1521 stores food material data corresponding to each cooking menu. For example, recorded for each menu number 2000 for identifying a menu (dish) are data 2001 indicating a menu (dish) name, data 2002 indicating food materials, data 2003 indicating the quantity for each food material, data 2004 indicating a caloric restriction level, data 2005 indicating a cooking sequence No., and data 2006 concerning food materials and seasonings to be used. In the present embodiment, the caloric restriction level is classified into, for example, six levels from 0 to 5. A cooking sequence No. is provided for each calorie restriction level of each menu.

FIG. 17 shows an exemplary data structure of sequence data table 1522 in recipe management DB 152.

Referring to FIG. 17, in sequence data table 1522, for each cooking sequence No. 2010, sequence data for cooking control in cooking appliance 400 is stored, including, for example, data 2011 indicating a preheating time, data 2012 indicating a preheating temperature, data 2013 indicating a heating time, and data 2014 indicating a heating temperature.

Customer management DB 154 manages information concerning a plurality of users 30 each holding a term catering contract with delivery agent 20. The information concerning customers is obtained from delivery agent terminal 200.

FIG. 18 shows an exemplary data structure of customer management DB 154.

Referring to FIG. 18, in customer management DB 154, for each customer number 2020 for identifying each user 30 who is a customer holding a term catering contract, data 2021 indicating an address, data 2022 indicating a name, data 2023 indicating an e-mail address, data 2030 indicating a contract status, data 2024 indicating a caloric restriction level, data 2025 indicating a seasoning level, and elimination information 2026 concerning food materials to be eliminated are stored.

Data 2025 indicating a seasoning level and elimination information 2026 may not be included in customer management DB 154 held in server 100. In addition, data 2021 indicating an address, data 2022 indicating a name, and data 2023 indicating an e-mail address may not be included in customer management DB 154 stored in server 100, in view of privacy protection.

Contract status data 2030 includes a contract start date and a contract term (up to three years).

The seasoning level is classified into, for example, fifteen levels of 1 to 15. The levels are adjusted based on the feedback information from user 30. Elimination information 2026 has, for example, items such as allergy, preference, and religious avoidance, and information about food materials (including seasonings) to be eliminated is stored in each item.

Popular menu management DB 156 manages information of processing results by feedback information processing unit 104. Exemplary contents of popular menu management DB 156 will be described later.

Next, the function overview of each processing unit will be described.

Recipe registration processing unit 102 performs a process of storing recipe information developed by manufacturer 10 into recipe management DB 152. Such a process can be performed by a known technique.

Feedback information processing unit 104 executes a prescribed process based on the feedback information obtained from delivery agent terminal 200 through communication I/F 116. The details will be described later. In addition, information concerning popular menus, such as ranking information, is transmitted to delivery agent terminal 200 through communication I/F 116.

Typically, the function of each processing unit as described above is realized by executing software stored in ROM 111.

(Functional Configuration of Delivery Agent Terminal)

FIG. 19 is a functional block diagram showing a functional configuration of delivery agent terminal 200 in the embodiment of the present invention.

Referring to FIG. 19, delivery agent terminal 200 includes as its function a menu provision processing unit 202, a registration and output processing unit 204, a notification processing unit 206, a delivery processing unit 208, and a feedback information processing unit 210. Hard disk 217 of delivery agent terminal 200 includes a customer management DB 254, a recipe management DB 252, a monthly menu DB 256, a reservation order management DB 258, and a popular menu DB 260.

First, each DB will be described.

Recipe management DB 252 manages recipe information for a plurality of cooking menus transmitted by the server in advance and includes, for example, a menu data table 2521. Menu data table 2521 has food material data and sequence identification data (cooking sequence No.) for identifying cooking sequence data in cooking appliance 400, corresponding to each menu. A data structure thereof may be similar to that of menu data table 1521 shown in FIG. 16. Sequence data table 1522 shown in FIG. 17 may also be stored in recipe management DB 252 of delivery agent terminal 200.

Customer management DB 254 manages information concerning each user 30 who is a customer holding a term catering contract. A data structure thereof may be similar to that of customer management DB 154 shown in FIG. 18. A description thereof is therefore not repeated here. Registration of information into customer management DB 254 can be executed by a known technique.

Stored in monthly menu DB 256 is information concerning menus monthly provided to user 30.

FIG. 20 shows an exemplary data structure of reservation order management DB 258.

Referring to FIG. 20, data 2041 indicating a daily menu number associated with customer number 2040 is stored in reservation order management DB 258. In other words, a menu number reserved and ordered on a monthly basis is stored for each user 30 in reservation order management DB 258.

The function overview of each processing unit will now be described.

Menu provision processing unit 202 performs a process of monthly providing user 30 with information concerning cooking menus. The process executed by menu provision processing unit 202 can be performed by a known technique. For example, a menu list is printed by printer 242 based on the information stored in monthly menu DB 256. In this case, deliveryman 20A delivers the menu list together with food materials. Alternatively, the menu list can be viewed by accessing the website of delivery agent 20 from user terminal 300.

Registration and output processing unit 204 is connected to reading device 240 to obtain reservation order information read from an application form 610 for storage into reservation order management DB 258. Furthermore, registration and output processing unit 204 outputs reservation sequence information concerning the reserved cooking menu for each user 30, based on the information in recipe management DB 252. "Reservation sequence information" includes at least a sequence No. for each reserved menu, that is, identification information for specifying sequence data to be used in cooking control.

In a case where user 30 owns user terminal 300, the reservation sequence information is output through communication I/F 216. In a case where user 30 does not own user terminal 300, for example, the reservation sequence information may be recorded in recording medium 218b so that the reservation sequence information is output. In the latter case, deliveryman 20A may bring recording medium 218b when delivering food materials, and deliveryman 20A or user 30 may insert recording medium 218b into cooking appliance 400 so that the reservation sequence information is set in cooking appliance 400.

Notification processing unit 206 gives a notification of contract status information of user 30 at prescribed intervals (for example, monthly) based on the contract status data of customer management DB 254. "Contract status information" at least includes a use status and information of cancellation charges for a term contract and preferably further includes a charge reduction status according to continuation of the contract. In the present embodiment, for example, such contract status information is printed on a bill that is monthly issued for user 30. Instead, the contract status information may be displayed when the website of delivery agent 20 is accessed at user terminal 300.

Here, the contract status information is displayed by notification processing unit 206, because of the following context: there is a possibility that user 30 has to terminate the contract due to relocation, diseases, and the like, although user 30 is supplied with food materials from delivery agent 20 on the premise that the contract continues for a certain term. On the other hand, the user may potentially become frustrated with the term catering contract based on the present term catering system 1, on fear that once the user signs a contract for a fixed term, a large amount of cancellation charges may be incurred in cancellation, or that the cancellation charge is relatively high depending on a cancellation timing.

The setting method of cancellation charges for the term catering contract and the cancellation charges are disclosed to user 30 for the purpose of giving user 30 satisfaction. The cancellation charges are therefore set on a reasonable criterion and are disclosed to user 30 as necessary. This reassures user 30 that he/she can make a cancellation at any time. The explicit indication of cancellation conditions alleviates the anxiety of user 30 and makes it clear that user 30 only has to pay the cancellation charge on a certain criterion. As a result, it can be expected that user 30 is motivated to continue the term catering contract. Such an approach of explicitly indicating cancellation charges by reasonably setting cancellation charges as in the present embodiment gives user 30 reassurance and is therefore preferable as compared with an approach of binding user 30 by setting heavy cancellation charges. Exemplary method of setting cancellation charges will be described later.

The set cancellation charges are explicitly indicated in the contract signed before starting of delivery, and in addition, the current cancellation charge is printed in the monthly bill to be clarified for user 30. This reassures user 30 and brings about the effect of allowing the user himself/herself to estimate (calculate) when it pays off to continue the contract.

Delivery processing unit 208 executes a process for delivering food materials every day to user 30 who made a reservation for that day, based on reservation order management DB 258. Specifically, document data to be attached to special container BX10.1, namely, four cards 801, 802, 803, 804, date label 805, and delivery checklist 82 are printed.

Feedback information processing unit 210 processes feedback information concerning the delivered food materials with recipes from user 30. For example, reading device 241 reads QR code 820 on customer wish card 803 (8032) to specify the user, and the content of the questionnaire filled in the above-noted customer wish card 803 (8032) is input. The input content is then transferred to server 100. Also in feedback information processing unit 210, a process of incorporating the input content is performed for each user 30. Feedback information processing unit 210 also stores information concerning popular menus transmitted from server 100 into popular menu DB 260.

It is noted that the function of each processing unit as described above is typically realized by executing software stored in ROM 211.

(Functional Configuration of User Terminal and Cooking Appliance)

Figures 21, 22, 23:
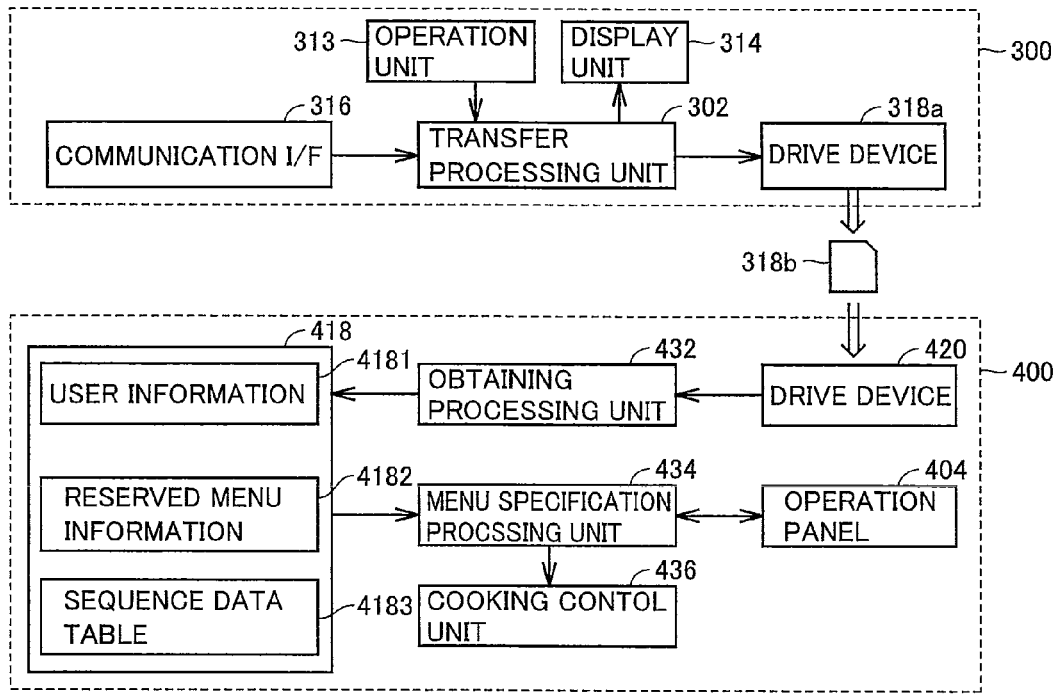
FIG. 21 is a functional block diagram showing respective functional configurations of the user terminal and the cooking appliance.
FIG. 22 shows an exemplary data structure of user information stored in a storage unit of the cooking appliance.
FIG. 23 shows an exemplary data structure of a reservation sequence information.

FIG. 21 is a functional block diagram showing the respective functional configurations of user terminal 300 and cooking appliance 400.

Referring to FIG. 21, user terminal 300 includes as its function a transfer processing unit 302. Transfer processing unit 302 performs a process of transferring to cooking appliance 400 the reservation sequence information about the target user 30 as transmitted from delivery agent terminal 200. Specifically, for example, the reservation sequence information is downloaded from the website provided by delivery agent terminal 200, through communication I/F 316. The downloaded reservation sequence information is then stored in removable recording medium 318*b* through drive device 318*a*.

Cooking appliance 400 includes as its function an obtaining processing unit 432, a menu specification processing unit 434, and a cooking control unit 436. Stored in storage unit 418 of cooking appliance 400 are user information 4181, reservation sequence information 4182, and a sequence data table 4183. The data in storage unit 418 will be described later.

Obtaining processing unit 432 performs a process of obtaining the reservation sequence information transferred from user terminal 300. For example, obtaining processing unit 432 drives drive device 420 to obtain the reservation sequence information from recording medium 318*b*. The obtained reservation sequence information is then stored in storage unit 418.

Menu specification processing unit 434 performs a process of specifying a menu for which cooking is to be started, based on an operation signal from operation panel 404. Cooking control unit 436 performs cooking control according to the cooking sequence data of the specified menu.

The function of each processing unit as described above is typically realized by executing software stored in ROM 311, storage unit 418.

FIG. 22 shows an exemplary data structure of user information 4181 stored in storage unit 418 of cooking appliance 400.

Referring to FIG. 22, user information 4181 includes data 2050 indicating the customer number for the target user 30 and data 2051 indicating the user name.

FIG. 23 shows an exemplary data structure of reservation sequence information 4182.

Referring to FIG. 23, reservation sequence information 4182 includes, for each data 2060 indicating a date, data 2061 indicating a menu number, data 2062 indicating a menu name, and data 2063 indicating a cooking sequence No.

The data structure of sequence data table 4183 is similar to that of sequence data table 1522 shown in FIG. 17. A description thereof will therefore not be repeated.

In the present embodiment, cooking appliance 400 which is a superheated steam oven can adjust the amount of fat contents to be removed even for the same dish. Therefore, in server 100, when a recipe is developed (or changed) and sequence data is registered in sequence data table 1522, such a sequence is set in that the amount of fat contents to be removed is increased as the caloric restriction level is higher.

The contents of user information 4181 and sequence data table 4183 are registered beforehand by a serviceman of manufacturer 10 or manufacturer affiliate company 50 when cooking appliance 40 is installed at the home of user 30. When a new recipe is developed in server 100, a serviceman of manufacturer affiliate company 50 is allowed to set new sequence data in cooking appliance 400. In this manner, a serviceman of manufacturer affiliate company 50 can update data in cooking appliance 400 because it is not user 30 but lease company 40 who has the ownership of cooking appliance 400.

<Operation>

An operation of term catering system 1 in the present embodiment will now be described.

(Reservation Sequence Information Storing Process)

Figure 24:
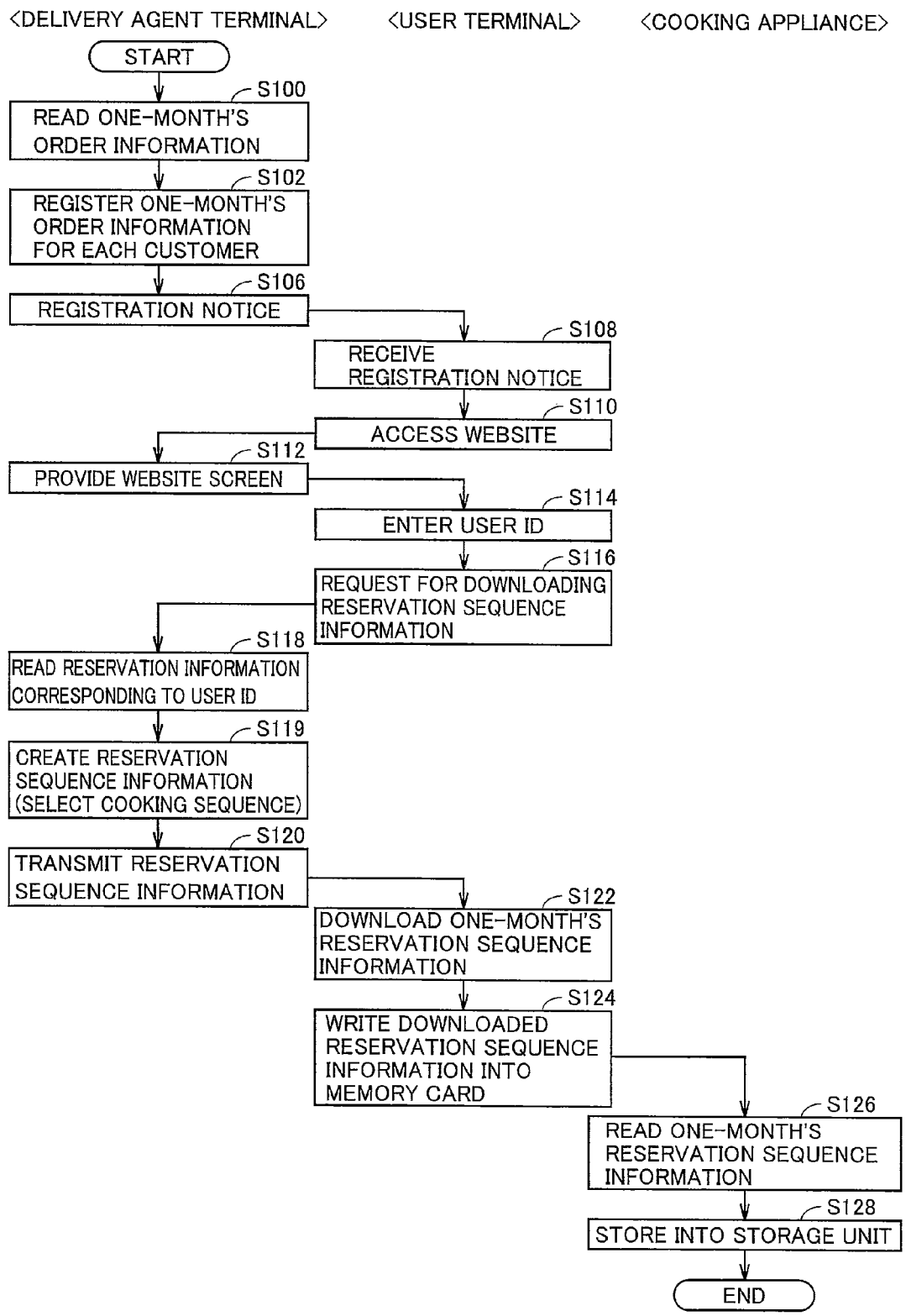
FIG. 24 is a flowchart showing a reservation sequence information storing process executed in the term catering system in the embodiment of the present invention.

FIG. 24 is a flowchart showing a reservation sequence information storing process executed in term catering system 1 in the embodiment of the present invention. In the present embodiment, this process is executed on a monthly basis.

Referring to FIG. 24, reading device 240 of delivery agent terminal 200 reads order information from menu application form 610 (step S100). Registration and output processing unit 204 then registers, for each user 30, data of the reserved menu number indicated by the order information in reservation order management DB 258 (step S102).

When order information is registered, registration and output processing unit 204 notifies the target user terminal 300 that the order information has been registered (step S106).

Specifically, for example, an e-mail is transmitted to the e-mail address stored in customer management DB 254.

When user terminal 300 receives the registration notification (step S108), transfer processing unit 302 accesses the website of delivery agent 20 based on an instruction from user 30 (step S110). Then, a website screen is provided by delivery agent terminal 200 (step S112). Here, an example of the website screen appearing on display unit 314 of user terminal 300 is shown in FIG. 25.

Figure 25:
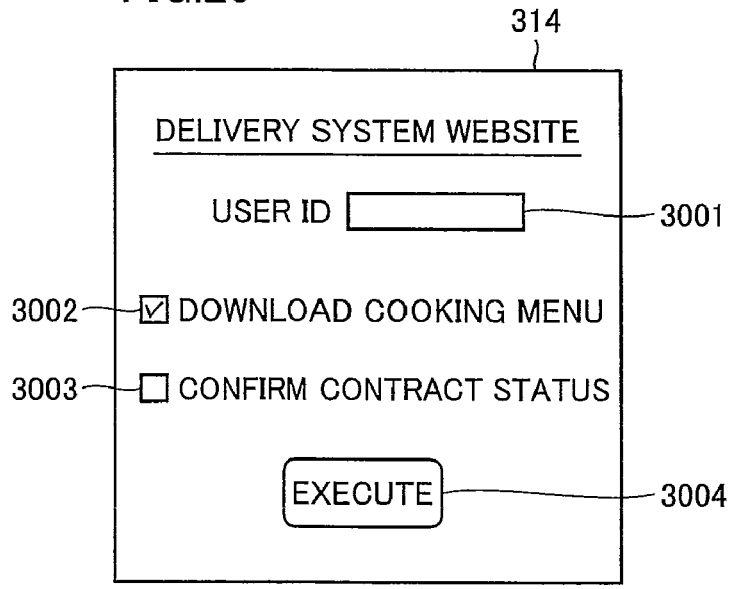
FIG. 25 is an example of a website screen of a delivery agent appearing on a display unit of the user terminal.

Referring to FIG. 25, display unit 314 presents a region 3001 for entering a customer number, a check box 3002 for designating downloading of a cooking menu, and a button 3004 for designating execution. A check box 3003 may be further provided for designating confirmation of a contract status, as shown in FIG. 25.

When the user enters the customer number in region 3001 in the screen shown in FIG. 25 (step S114) and selects execution designating button 3004, transfer processing unit 302 makes a request to download the reservation sequence information (step S116).

At the request for downloading, registration and output processing unit 204 of delivery agent terminal 200 reads from reservation order management DB 258 order information (menu number) for one month (typically, for the next month) corresponding to the entered customer number (step S118). Registration and output processing unit 204 then generates reservation sequence information to be stored in cooking appliance 400, based on the read order (step S119). In step S119, registration and output processing unit 204 selects the cooking sequence suitable for each user 30. Specifically, for example, if the reserved menu number is "LC2580" and the caloric restriction level for the user is "1," "LC 25801" which is a combination thereof is selected as a cooking sequence No. suitable for the user. Here, the generated reservation sequence information also includes a menu number and a menu name, as shown in FIG. 23.

Registration and output processing unit 204 of delivery agent terminal 200 transmits the generated reservation sequence information to user terminal 300 through communication I/F 216 (step S120). Accordingly, one month's reservation sequence information is downloaded by transfer processing unit 302 of user terminal 300 (step S122). The downloaded reservation sequence information is written into recording medium (for example, memory card) 318b (step S124).

When user 30 inserts memory card 318b having the reservation sequence information written therein, into a slot (not shown) of cooking appliance 400, drive device 420 of cooking appliance 400 reads the one month's reservation sequence information from memory card 318b (step S126). Obtaining processing unit 432 stores the read reservation sequence information in storage unit 418 (step S128). The stored reservation sequence information is reservation sequence information 4182 shown in FIG. 23. In the present embodiment, at least two months' reservation sequence information for this month and the next month is stored.

In this manner, information for specifying cooking sequence data of the menu reserved by the user every month is stored in cooking appliance 400. Although in the present embodiment it is assumed that an order is accepted on a monthly basis, the present invention is not limited thereto and an order may be accepted, for example, on a weekly basis.

(Printing Process Before Delivery)

Figure 26:
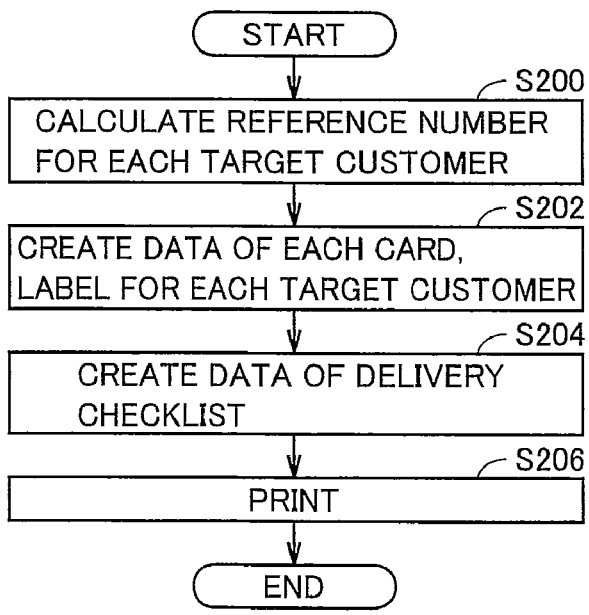
FIG. 26 is a flowchart showing a printing process before delivery that is executed by the delivery agent terminal in the term catering system in the embodiment of the present invention.

FIG. 26 is a flowchart showing a printing process before delivery, which is executed by delivery agent terminal 200 in term catering system 1 in the embodiment of the present invention. This process is executed, for example, on the morning of the day when food materials are to be delivered.

Referring to FIG. 26, delivery processing unit 208 of delivery agent terminal 200 calculates, for example, a three-digit reference number that functions as authentication information for each target customer (user 30) (step S200).

The reference number is employed for the purpose of security and preventing misdelivery. In actuality, in order to achieve the minimum effect, it is at least confirmed during the operation of user 30 that the customer number and the menu number for the distributed food material are not wrong. Here, an exemplary method of calculating such a reference number is shown that cannot be easily guessed and may ensure the security to such an extent that coincidence in the neighborhood is avoided. More specifically, for each of the customer number and the menu number, a four-digit number is derived from the positions in the English alphabet. A three-digit integer is derived by calculating the derived four-digit number and the four-digit number following each alphabet in accordance with a prescribed formula.

A four-digit number derived from two letters of the customer number is represented as "first specifying number," and a four-digit number derived from two letters of the menu number is represented as "second specifying number." The reference number is the last three digits of the number (referred to as "base number" hereinafter) obtained by "first specifying number"×8+"numerals of customer number"×4+ "second specifying number"×2+"numerals of menu number"×1+constant (for example, 781). The constant may be an integer that is randomly selected.

It is assumed that a customer number is "AH1002" and a menu number is "LC2580" by way of example.

Here, "A" is the first letter and "H" is the eighth letter, and therefore "AH" is represented as "0108" by combining them. "L" is the twelfth letter and "C" is the third letter, and therefore "LC" is represented as "1203" by combining them. As a result, the base number is calculated as follows:

$$\text{base number} = 0108 \times 8 + 1002 \times 4 + 1203 \times 2 + 2580 \times 1 + 781$$
$$= 10639.$$

Therefore, the last three digits "639" of "10639" are used as a reference number.

The foregoing technique is an example of rudimentary algorithm for generating a unique three-digit number without any trouble in practical use. In the actual system operation, a more sophisticated calculation method may be employed.

Delivery processing unit 208 generates data of each card 801, 802, 803, 804 and label 805 for each target customer, based on the operator's operation (step S202). In addition, delivery processing unit 208 generates data of delivery checklist 82 as shown in FIG. 9 (step S204).

When each data is generated, each document (card, delivery checklist, and the like) is printed in printer 242 (step S206). The printed cards and label are attached to special container BX10.1.

A worker for delivery agent 20 puts food materials to be delivered to user 30 into special container BX10.1 having such necessary information attached thereto. Then, as shown in FIG. 3, deliveryman 20A delivers special container BX10.1 containing food materials on that day (preferably, at a designated time).

(Cooking Process)

Figure 27:
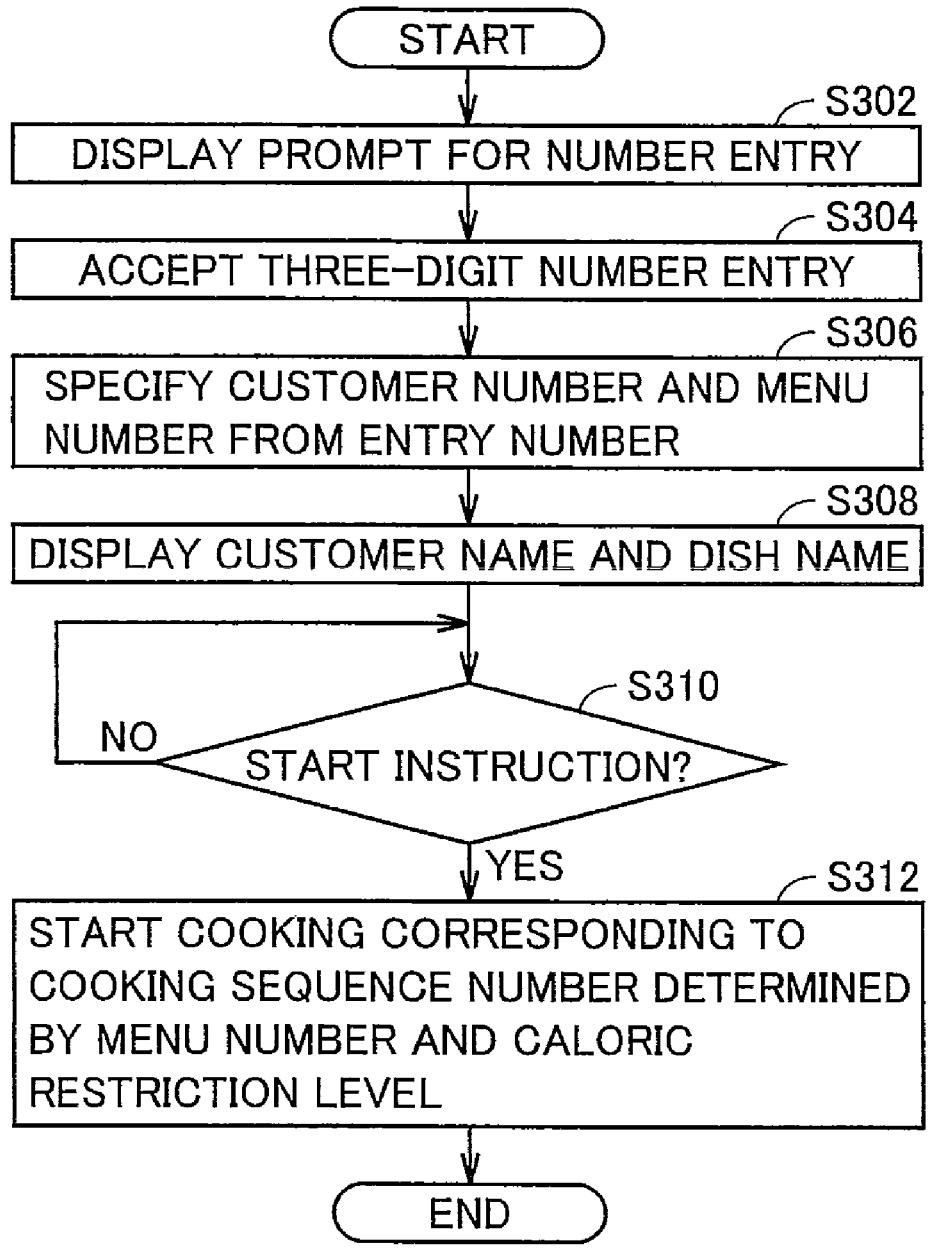
FIG. 27 is a flowchart showing a cooking process executed by the cooking appliance in the term catering system in the embodiment of the present invention.

FIG. 27 is a flowchart showing a cooking process executed by cooking appliance 400 in term catering system 1 in the embodiment of the present invention. This process is started when user 30 inputs an instruction to start cooking based on the term catering contract. User 30 can operate operation panel 404 in accordance with operation procedure 811 (FIG. 5) provided on cooking guide card 803 (8031) attached to special container BX10.1. The following process is performed assuming that the delivered food materials have been put into cooking appliance 400 by user 30.

The cooking process is expected to be executed on the day when food materials are delivered. The cooking process, however, may not be executed on that day since some kinds of food materials may be cooked after the next day.

Referring to FIG. 27, first, menu specification processing unit 434 of cooking appliance 400 allows operation panel 404 to display a prompt to enter a reference number (step S302). For example, a message "please enter the three-digit number provided on the cooking guide" appears on operation panel 404.

When an entry of a reference number by user 30 is accepted (step S304), the customer number and the menu number are specified from the accepted reference number according to a prescribed algorithm (step S306). Specifically, a process of deriving the original customer number and menu number by analyzing the three-digit number calculated by the above-stated reference number calculation algorithm is performed.

Then, menu specification processing unit 434 displays the customer name and the dish name on operation panel 404 based on the specified customer number and menu number (step S308). In the present embodiment, only information for one user who is given the right to use cooking appliance 400 is stored as user information 4181 in storage unit 418. Therefore, if the specified customer number is different from the stored customer number 2050, for example, an error is indicated. Menu specification processing unit 434 searches through menu numbers 2061 in reservation sequence information 4182 in storage unit 418 for the specified menu number and displays the menu name corresponding to the found menu number on operation panel 404. If the specified menu number does not exist among menu numbers 2061 in reservation sequence information 4182, for example, an error is indicated, as mentioned above.

Then, when user 30 inputs a start instruction (step S310), cooking control unit 436 extracts the cooking sequence No. determined by the specified menu number and the user's caloric restriction level and starts cooking corresponding to the extracted cooking sequence No. Specifically, data 2063 of the cooking sequence No. associated with the specified menu number in reservation sequence information 4182 is extracted. Then, the sequence data associated with the extracted cooking sequence No. in sequence data table 4183 is read, so that cooking control is started according to the contents (recipe) indicated by the read sequence data (S312).

In this manner, in accordance with the present embodiment, cooking corresponding to the caloric restriction level for user 30 is automatically executed. Then, upon completion of the cooking control, a dish is finished exactly like the recipe. Accordingly, user 30 can taste a healthy and delicious dish just like the recipe according to his/her own caloric restriction level. As a result, by using the term catering service, user 30 can taste his/her preferred recipe while such medical conditions as over weight, hypertension, and diabetes are improved and the calorie intake is reduced.

In addition, because of such effects, it is also expected that the number of users who use the term catering service is increased, for example, through word of mouth. Delivery agent 20 can thus increase its customers. Furthermore, by quoting users' successful experiences, manufacturer 10 can advertize cooking appliance 400 with such expressions that are difficult for the manufacturer itself to use. Alternatively, the effect and usefulness of cooking appliance 400 can be introduced in the form of statistically meaningful data, to consumers in general. Specifically, by processing the feedback information from user 30, the results of evaluations by a large number of users can be communicated, and regionally different popular menus can be advertized to consumers other than the members (user 30) of the present system.

Here, it may be stipulated that manufacturer 10 pays a prescribed amount of money to delivery agent 20 according to the number of users holding the term catering contract. Alternatively, since delivery agent 20 advertizes cooking appliance 400 to general consumers for the purpose of increasing the members, manufacturer 10 may pay a prescribed amount as an advertising expense when contracting with delivery agent 20. Under the default contract condition, delivery agent 20 pays lease fees on behalf of user 30. However, by giving incentive from manufacturer 10 to delivery agent 20 in this manner, the effect of increasing the users of the present service can be expected.

Alternatively, delivery agent 20 may return a part of such incentives to the members of the present service, and in such a case, more attractive contract terms can be set for manufacturer 10, delivery agent 20, and user 30. Accordingly, the effect of increasing the users of the present service can be expected even more.

One of main objects of provision of the term catering system is to provide a meaningful benefit for each of manufacturer 10, delivery agent 20, and user 30 by producing such a positive feedback phenomenon, and it is therefore desired to provide an appropriate incentive based on sophisticated information processing.

Specifically, when information concerning a new customer is sent from delivery agent terminal 200, server 100 may automatically transmit a prescribed amount of money to the account of delivery agent terminal 200 through a bank server (not shown) connected to the Internet 6.

(Feedback Process)

Figure 28:
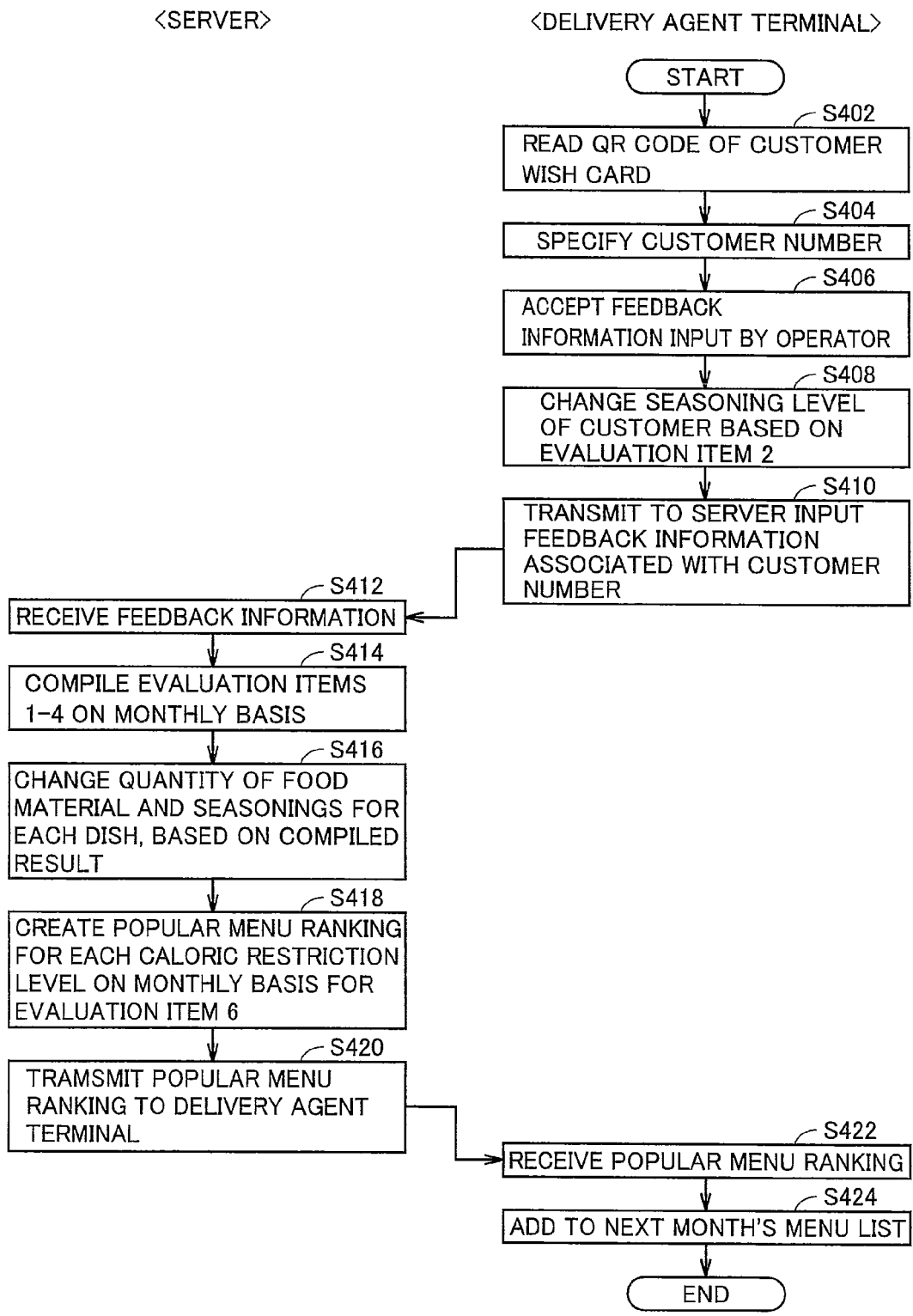
FIG. 28 is a flowchart showing a feedback process executed in the term catering system in the embodiment of the present invention.

FIG. 28 is a flowchart showing a feedback process executed in term catering system 1 in the embodiment of the present invention.

Referring to FIG. 28, reading device 241 of delivery agent terminal 200 reads QR code 820 on customer wish card 803 (8032) (step S402). Feedback information processing unit 210 of delivery agent terminal 200 specifies a customer number from the read QR code (step S404).

Then, feedback information processing unit 210 accepts feedback information input by the operator, that is, the content of the filled-in evaluation section 821 (FIG. 6) of customer wish card 803 (step S406). The present invention is not limited to input by the operator, and evaluation information may be read by reading device 240 for reading application form 610.

Feedback information processing unit 210 changes seasoning level 2025 of customer management DB 254, if necessary, according to the accepted content (step S408). Specifically, when any box other the middle one is filled in the field of evaluation item 2 (seasoning) in section 821 shown in FIG. 6, seasoning level 2025 is changed so that seasoning satisfies the user's taste. Feedback information processing unit 210 may perform a process other than adjustment of seasoning level, based on the feedback information.

Furthermore, feedback information processing unit 210 transmits to server 100 the input feedback information associated with the customer number (step S410).

Feedback information processing unit 104 of server 100 receives the feedback information (step S412). The received feedback information is stored, for example, in a prescribed region of hard disk 117. In this manner, in accordance with the present embodiment, the feedback information concerning the recipes for use in cooking appliance 400 can be obtained easily and frequently through delivery agent terminal 200. As a result, manufacturer 10 can improve and develop recipes as appropriate and can give those recipes to delivery agent 20. Accordingly, delivery agent 20 can obtain new recipes and improved recipes without developing recipes by itself. As a result, delivery agent 20 can cut costs for developing recipes. Such a benefit for delivery agent 20 is also one of the reasons why delivery agent 20 can pay lease fees for cooking appliance 400 on behalf of user 30.

It is noted that manufacturer 10 may pay a prescribed amount of money when obtaining feedback information, for example, depending on its number. In this manner, a large amount of feedback information can be absorbed by giving an incentive for feedback information to delivery agent 20 as well. Therefore, here, in the similar manner as described above, for example, when feedback information is sent from delivery agent terminal 200, server 100 may automatically transfer a prescribed amount of money to the account of delivery agent terminal 200 through a bank server (not shown) connected to the Internet 6.

Next, each of evaluation items 1-4 (the quantity of dish, seasonings, vegetables, rice) in section 821 shown in FIG. 6 is compiled, for example, on a monthly basis (step S414). Based on the compiled result, the quantity or kinds of food materials and seasonings may be changed for each dish (step S416).

In the present embodiment, feedback information processing unit 104 creates popular menu ranking for each caloric restriction level at prescribed intervals (for example, monthly) for evaluation item 6 (satisfactory (favor) or not as a whole) in section 821 shown in FIG. 6 (step S418). Specifically, a description will be made with reference to FIG. 29.

FIG. 29 shows an exemplary data structure of evaluation management table 1561 stored in popular menu management DB 156.

Referring to FIG. 29, provided in evaluation management table 1561 are data 2080 indicating a menu number, data 2081 indicating a caloric restriction level, and a data field 2082 including five satisfaction levels (2, 1, 0, −1, −2).

For example, when evaluation is "2 (satisfactory)" among the five satisfaction levels, feedback information processing unit 104 increments by one the value in the data field of satisfaction level "2" in the row of caloric restriction level for the target user in the field of the corresponding menu number. Such processing may be performed at a timing when feedback information is received. Then, for example, at the beginning of a month, a popular menu ranking table as shown in FIG. 30 is created in decreasing order of value of satisfaction level "2" for each caloric restriction level. Ranking may not be limited to the one based on the absolute value of numerical value of satisfaction level "2" but may be the one based on the relative value.

FIG. 30 shows an exemplary data structure of popular menu ranking table 1562 stored in popular menu management DB 156.

Referring to FIG. 30, a monthly popular menu 2091 associated with caloric restriction level 2090 is stored in popular menu ranking table 1562. Specifically, the menu numbers up to a certain rank (for example, the top ten) are stored in decreasing order of value of satisfaction level "2."

Referring to FIG. 28 again, when the last month's popular menu ranking is created, feedback information processing unit 104 of server 100 transmits the information of the last month's popular menu ranking, that is, the information of the menu numbers associated with the ranked order to delivery agent terminal 200 (step S420).

Feedback information processing unit 210 of delivery agent terminal 200 receives the information of the last month's popular menu ranking (step S422) for storage into popular menu DB 260 in hard disk 217. Accordingly, data similar to popular menu ranking table 1562 in FIG. 30 is also stored in popular menu DB 260 of delivery agent terminal 200.

Delivery agent terminal 200 performs a process of incorporating the information stored in popular menu DB 260 into the next month's menu. For example, menu provision processing unit 202 adds the information of popular menu ranking for each caloric restriction level to the next month's menu list (step S424). By doing so, user 30 can know which is delicious in his/her own restriction level, while deliveryman 20A of delivery agent 20 does not know to which caloric restriction level user 30 belongs, so that privacy can be protected.

In the process in step S424, the next month's menu list may be created by sorting the next month's menu information stored in monthly menu DB 256 according to the ranking for each caloric restriction level.

(Contract Status Information Notification Process)

Figures 31, 32:
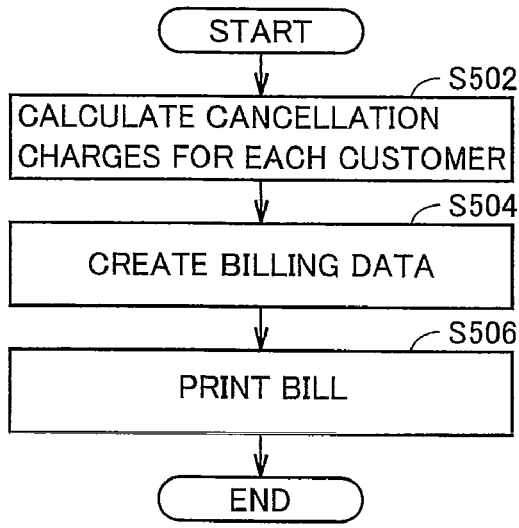
FIG. 31 is a flowchart showing a contract status information notification process executed in the term catering system in the embodiment of the present invention.
FIG. 32 shows an example of decreasing cancellation charges according to elapsed months in a case of a one-year contract.

FIG. 31 is a flowchart showing a contract status information notification process executed in term catering system 1 in the embodiment of the present invention. In the present embodiment, the contract status is printed on a monthly-issued bill so that user 30 is notified of the contract status.

Referring to FIG. 31, notification processing unit 206 calculates cancellation charges for each customer (step S502). Specifically, cancellation charges are calculated based on the current date (date and month) output by a time counting unit (not shown) included in delivery agent terminal 200 and contract status data 2030 in customer management DB 254.

Here, a specific method of setting cancellation charges will be described. For example, it is assumed that pricing is such that cooking appliance 400 is priced at 100,000 yen per unit and the total lease fee (one year) is 111,600 yen per year and per unit. In this case, the monthly lease fee is 9,300 yen. Assuming that the daily food material cost is, for example, 1000 yen, the monthly food material cost is 30,000 yen (1,000 yen*30 days). Then, the total monthly cost is 39,300 yen (9,300 yen+30,000 yen).

The cancellation charges (early termination charges) can be expressed by the following equation:

early termination charge=total lease fee−(monthly lease fee×elapsed months)+delivery cancellation charge.

For example, in a case of cancellation at the beginning of the fifth month after four months of use, the early termination charge is calculated as follows:

$$\text{early termination charge} = 111{,}600 \text{ yen} -$$
$$(9{,}300 \text{ yen} \times \text{four months}) + 39{,}300 \text{ yen}$$
$$= 113{,}7000 \text{ yen}$$

In term catering system 1, cooking appliance 400 should be returned at the termination of the contract. Here, for example, it costs about 10,000 yen for pickup, including technical fee and on-site service fee. In a case of contract termination due to expiration of the contract term, the pickup cost is borne by delivery agent 20 as the cost covered by the term catering contract. However, in a case of early contract termination, the cost is not covered by the term catering contract, and it may be appropriate that user 30 bears the pickup cost.

An example of decreasing cancellation charges according to elapsed months in a case of one-year contract is shown in FIG. 32.

Such handling as mentioned above is based on the following context: in a case of early termination, the appliance unit price has not yet been depreciated. Therefore, delivery agent 20 has to recover a part of the undepreciated portion of the unit price, for example, by reselling the returned appliance after maintenance and safety check. Thus, it may be difficult for delivery agent 20 to absorb the cost incurred.

Referring to FIG. 31 again, notification processing unit 206 creates billing data base on the last month's order data stored in reservation order management DB 258 and the charge predetermined for each dish (step S504). Then, a bill including contract status information is printed (step S506).

As described above, in the present embodiment, an advance notice of decreasing fee status according to continuation of the contract gives a prospect that the use fees are decreased by continuously using and continuously enjoying the benefit from term catering system 1, thereby effectively preventing early termination.

Furthermore, discloser of cancellation charges and decreasing use fees to user 30 as needed motivates user 30 to continue the contract as long as user 30 is satisfied with the term catering service. In addition, any loss caused by the above-noted early termination can be decreased. Moreover, the customer satisfaction of user 30 can be increased, so that user 30 can continuously receive delivery service by term catering system 1 with satisfaction. One of main objects of provision of the term catering service is to give consumers a psychological effect of eliminating their concerns about initial costs and usefulness, which the consumers potentially hold for superheated steam ovens. Therefore, a billing system that does not give a feeling of binding to users is desirable.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A term catering system for a delivery agent to deliver a food material to a plurality of customers for a certain term, comprising:
   a plurality of cooking appliances to be lent to each of said customers for a certain term; and
   a management device to be held by said delivery agent and a manufacturer of said cooking appliances, said management device including a first customer management database for managing information concerning said customers, and
   a first recipe management database for storing first recipe information concerning a plurality of cooking menus,
   wherein said first recipe information has food material data and sequence identification data for identifying cooking sequence data for said cooking appliances, corresponding to each said cooking menu,
   said management device further including an output processing unit for outputting reservation sequence information including said sequence identification data corresponding to a reserved cooking menu, for each said customer,
   each said cooking appliance including
   a first storage unit for storing a plurality of said cooking sequence data, in advance, and
   a cooking control unit for controlling cooking of a food material delivered by said delivery agent, according to cooking sequence data specified by said reservation sequence information output by said management device, among said plurality of cooking sequence data,
   said management device further including a second storage unit for storing feedback information concerning a cooking result of said delivered food material from said customer.

2. The term catering system according to claim 1, wherein said management device includes a first terminal to be held by said delivery agent, and
   a server to be connected to said first terminal via the Internet and held by said manufacturer,
   said first terminal has said first customer management database, said first recipe management database, said output processing unit, and said first information processing unit, and further has a first information processing unit for performing a process for obtaining said feedback information from said customer and transmitting said obtained feedback information to said server, and said server has said second storage unit.

3. The term catering system according to claim 2, wherein said first customer management database stores one of a plurality of caloric restriction levels, for each said customer,
   said first recipe information has a plurality of said sequence identification data respectively corresponding to said caloric restriction levels, for each said cooking menu, and
   said output processing unit selects said sequence identification data according to corresponding said caloric restriction level, for each said customer, and generates said reservation sequence information including said selected sequence identification data.

4. The term catering system according to claim 3, wherein said server further includes a second customer management database for managing information concerning said customer as transmitted in advance by said first terminal, and
   a second recipe management database for managing second recipe information concerning said plurality of cooking menus, and
   said second recipe information has said food material data and said cooking sequence data that are associated with a combination of each said cooking menu and each said caloric restriction level.

5. The term catering system according to claim 3, wherein said server further includes a second information processing unit for generating ranking information of popular menus based on said feedback information, for each said caloric restriction level, and transmitting said generated ranking information to said first terminal, and
   said first terminal further includes a menu provision unit for providing information concerning said cooking menus that reflect said ranking information transmitted from said server.

6. The term catering system according to claim 5, wherein said menu provision unit provides said information concerning said cooking menus that are sorted in an ranking order based on said ranking information.

7. The term catering system according to claim 1, wherein said first customer management database further stores a seasoning level for each said customer, and
    said first information processing unit additionally adjusts said seasoning level based on said feedback information.

8. The term catering system according to claim 1, further comprising a second terminal to be connected with said first terminal via the Internet and held by each said customer, wherein said output processing unit transmits said reservation sequence information to said second terminal.

9. The term catering system according to claim 8, wherein said second terminal includes a transfer processing unit for performing a process for transferring to said cooking appliance said reservation sequence information transmitted from said first terminal, and
    said first storage unit further stores said reservation sequence information transferred from said second terminal.

10. A term catering method for a delivery agent to deliver food materials to a plurality of customers for a certain term, said method comprising:
- lending a plurality of cooking appliances to each said customer for a certain term and by a management device held by said delivery agent and a manufacturer of said cooking appliances, wherein said management device includes a customer management database for managing information concerning said customers and a recipe management database for storing recipe information concerning a plurality of cooking menus, said recipe information having food material data and sequence identification data for identifying cooking sequence data for said cooking appliances, corresponding to each said cooking menu;
- outputting by said management device, reservation sequence information including said sequence identification data corresponding to a reserved cooking menu for each said customer;
- specifying by said cooking appliance, one of a plurality of said cooking sequence data stored beforehand, based on said reservation sequence information output by said management device;
- controlling cooking of a food by said cooking appliance, material delivered by said delivery agent, according to said specified cooking sequence data; and
- storing by said management device, feedback information concerning a cooking result of said delivered food material from said customer.

* * * * *